US012598032B2

(12) United States Patent
Cheong et al.

(10) Patent No.: US 12,598,032 B2
(45) Date of Patent: Apr. 7, 2026

(54) ELECTRONIC DEVICE FOR TRANSMITTING VOICE DATA, AND OPERATION METHOD THEREOF

(71) Applicant: SAMSUNG ELECTRONICS CO., LTD., Suwon-si (KR)

(72) Inventors: Gupil Cheong, Suwon-si (KR); Chunwoo Ryu, Suwon-si (KR); Juyeon Jin, Suwon-si (KR); Euibum Han, Suwon-si (KR); Doosuk Kang, Suwon-si (KR); Bokun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 18/119,934

(22) Filed: Mar. 10, 2023

(65) Prior Publication Data

US 2023/0208572 A1 Jun. 29, 2023

Related U.S. Application Data

(63) Continuation of application No. PCT/KR2021/010560, filed on Aug. 10, 2021.

(30) Foreign Application Priority Data

Sep. 11, 2020 (KR) ........................ 10-2020-0116677

(51) Int. Cl.
H04L 1/1867 (2023.01)
H04L 1/00 (2006.01)

(52) U.S. Cl.
CPC ............ H04L 1/189 (2013.01); H04L 1/0083 (2013.01)

(58) Field of Classification Search
None
See application file for complete search history.

(56) References Cited

U.S. PATENT DOCUMENTS 8,433,050 B1 * 4/2013 Baten .................... H04M 3/568
379/202.01
8,619,732 B2 12/2013 Khairmode et al.
(Continued)

FOREIGN PATENT DOCUMENTS

CN        111385778 A      7/2020
JP        2002-290415 A    10/2002
(Continued)

OTHER PUBLICATIONS

International Search Report (PCT/ISA/210) issued by the International Searching Authority on Nov. 8, 2021 in International Application No. PCT/KR2021/010560.
(Continued)

*Primary Examiner* — Anh Vu H Ly
(74) *Attorney, Agent, or Firm* — Sughrue Mion, PLLC

(57) ABSTRACT

An electronic device includes: a communication circuit; and at least one processor operatively coupled to the communication circuit, wherein the least one processor is configured to: establish communication with an external electronic device through the communication circuit; configure a first packet type for transmission or reception of voice data through negotiation with the external electronic device; transmit first voice data to the external electronic device based on the first packet type; and based on receiving reception failure information corresponding to the first voice data from the external electronic device or not receiving reception information corresponding to the first voice data from the external electronic device, retransmit second voice (Continued)

data to the external electronic device based on a second packet type different from the first packet type.

17 Claims, 17 Drawing Sheets

(56)                    References Cited

U.S. PATENT DOCUMENTS

| | | | |
|---|---|---|---|
| 9,713,018 B2 | 7/2017 | Das et al. | |
| 2003/0012137 A1* | 1/2003 | Abdelilah | H04L 47/10 |
| | | | 370/352 |
| 2006/0209898 A1* | 9/2006 | Abdelilah | H04L 65/752 |
| | | | 370/477 |
| 2007/0223430 A1* | 9/2007 | Desai | H04L 1/1854 |
| | | | 370/338 |
| 2008/0025300 A1* | 1/2008 | Lide | H04L 65/80 |
| | | | 370/389 |
| 2008/0026695 A1 | 1/2008 | Choi et al. | |
| 2008/0130620 A1 | 6/2008 | Liu et al. | |
| 2016/0302026 A1 | 10/2016 | Lee et al. | |
| 2018/0132189 A1* | 5/2018 | Sundararajan | H04W 16/32 |
| 2019/0132091 A1 | 5/2019 | Cohn et al. | |
| 2019/0253800 A1 | 8/2019 | Hsieh | |
| 2020/0084697 A1 | 3/2020 | Sridhara et al. | |
| 2020/0162205 A1 | 5/2020 | Han et al. | |
| 2020/0265854 A1 | 8/2020 | Moon et al. | |

FOREIGN PATENT DOCUMENTS

| | | | |
|---|---|---|---|
| JP | 2019-220865 A | 12/2019 | |
| KR | 10-2002-0002792 A | 1/2002 | |
| KR | 10-2007-0073288 A | 7/2007 | |
| KR | 10-2008-0010758 A | 1/2008 | |
| KR | 10-2009-0094353 A | 9/2009 | |
| KR | 10-2018-0128302 A | 12/2018 | |
| KR | 10-2116062 B1 | 5/2020 | |
| KR | 10-2020-0101012 A | 8/2020 | |
| WO | 2015/069031 A1 | 5/2015 | |

OTHER PUBLICATIONS

Written Opinion (PCT/ISA/237) issued by the International Searching Authority on Nov. 8, 2021 in International Application No. PCT/KR2021/010560.

* cited by examiner

START

1201 — ESTABLISH COMMUNICATION WITH EXTERNAL ELECTRONIC DEVICE

1203 — NEGOTIATE COMMUNICATION VARIABLES RELATED TO VOICE CALL

1205 — IS PACKET TYPE CHANGE SECTION?

NO

1209 — TRANSMIT VOICE DATA, BASED ON FIRST PACKET TYPE

YES

1207 — TRANSMIT VOICE DATA, BASED ON SECOND PACKET TYPE

END

ELECTRONIC DEVICE FOR TRANSMITTING VOICE DATA, AND OPERATION METHOD THEREOF

CROSS-REFERENCE TO RELATED APPLICATIONS

This application is a by-pass continuation of International Application No. PCT/KR2021/010560, filed on Aug. 10, 2021, which is based on and claims priority to Korean Patent Application No. 10-2020-0116677, filed on Sep. 11, 2020, in the Korean Intellectual Property Office, the disclosures of which are incorporated by reference herein in their entireties.

BACKGROUND

1. Field

The disclosure relates to devices and methods for transmitting voice data in an electronic device.

2. Description of Related Art

An electronic device may transmit and/or receive voice data with an external electronic device using a Bluetooth function. For example, when the electronic device and the external electronic device support a hand free profile (HFP), the electronic device and the external electronic device may transmit and/or voice data.

An electronic device may configure a packet type and/or a packet length through negotiation with an external electronic device before configuring a call with the external electronic device. The electronic device may transmit and/or receive voice data with the external electronic device, based on the packet type and/or packet length negotiated with the external electronic device.

In the electronic device, the voice data received from the external electronic device may be lost or not decoded, and thus, sound quality of a voice call may be degraded, based on a change in a radio channel. For example, the electronic device may have a problem in that the voice data received from the external electronic device is lost or cannot be normally decoded due to a relatively distant distance from the external electronic device. For another example, in the electronic device, the voice data transmitted and/or received with the external electronic device may be lost or not normally decoded due to wireless noise on a radio channel used for communication with the external electronic device.

SUMMARY

Provided are devices and methods for efficiently transmitting and/or receiving voice data with an external electronic device through Bluetooth communication in an electronic device.

According to an aspect of the disclosure, an electronic device includes: a communication circuit; and at least one processor operatively coupled to the communication circuit, wherein the least one processor is configured to: establish communication with an external electronic device through the communication circuit; configure a first packet type for transmission or reception of voice data through negotiation with the external electronic device; transmit first voice data to the external electronic device based on the first packet type; and based on receiving reception failure information corresponding to the first voice data from the external electronic device or not receiving reception information corresponding to the first voice data from the external electronic device, retransmit second voice data to the external electronic device based on a second packet type different from the first packet type.

The least one processor may be further configured to, based on receiving reception failure information corresponding to the second voice data from the external electronic device, retransmit third voice data to the external electronic device based on the first packet type.

The least one processor may be further configured to, based on receiving reception failure information corresponding to the second voice data from the external electronic device, retransmit fourth voice data to the external electronic device based on the second packet type.

The first packet type may include information related to at least one of a first modulation method or a first packet length, established through negotiation with the external electronic device, for transmission of voice data, and the second packet type may include information related to at least one of a second modulation method that is different from the first modulation method or a second packet length that is different from the first packet length.

The first packet type further may include one of high-quality voice (HV)1, HV2, HV3, data-voice (DV), enhanced voice packet (EV)3, 2-EV3, 3-EV3, EV4, EV5, 2-EV5, and 3-EV5, and the second packet type may be different from the first packet type and further may include one of high-quality voice (HV)1, HV2, HV3, data-voice (DV), enhanced voice packet (EV)3, 2-EV3, 3-EV3, EV4, EV5, 2-EV5, and 3-EV5.

The least one processor may be further configured to: receive, from the external electronic device, fifth voice data of the first packet type and the reception failure information corresponding to the first voice data; decode the fifth voice data; and transmit information corresponding to reception of the fifth voice data to the external electronic device.

The least one processor may be further configured to transmit, to the external electronic device, information corresponding to reception of the fifth voice data together with the second voice data based on the second packet type.

The least one processor may be further configured to, based on the reception failure information corresponding to the fifth voice data being transmitted to the external electronic device, receive sixth voice data of the second packet type from the external electronic device.

The first voice data and the second voice data may include the same voice information.

The first voice data and the second voice data may include different voice information.

According to an aspect of the disclosure, an operation method of an electronic device, includes: establishing communication with an external electronic device; configuring a first packet type for transmission or reception of voice data through negotiation with the external electronic device; transmitting first voice data to the external electronic device based on the first packet type; and based on receiving reception failure information corresponding to the first voice data from the external electronic device or not receiving reception information corresponding to the first voice data from the external electronic device, retransmitting second voice data to the external electronic device based on a second packet type different from the first packet type.

The operation method may further include, based on receiving reception failure information corresponding to the second voice data from the external electronic device, retransmitting third voice data to the external electronic device based on the first packet type.

The operation method may further include, based on receiving reception failure information corresponding to the second voice data from the external electronic device, retransmitting fourth voice data to the external electronic device based on the second packet type.

The operation method may further include: receiving, from the external electronic device, fifth voice data of the first packet type and reception failure information corresponding to the first voice data; decoding the fifth voice data; and transmitting information corresponding to reception of the fifth voice data to the external electronic device.

The transmitting information related to the reception of the fifth voice data to the external electronic device may include transmitting, to the external electronic device, the information corresponding to reception of the fifth voice data together with the second voice data, based on the second packet type.

The operation method may further include, based on the reception failure information corresponding to the fifth voice data being transmitted to the external electronic device, receiving sixth voice data of the second packet type from the external electronic device.

According to various embodiments of the disclosure, by retransmitting voice data in a packet type that has not been negotiated with an external electronic device, a retransmission rate of voice data may be reduced in the electronic device, thereby reducing current consumption due to transmission of voice data.

According to various embodiments, by transmitting (or retransmitting) voice data in a packet type that has not been negotiated with an external electronic device, based on a radio channel with the external electronic device and/or internal resources of the electronic device, loss of voice data or error occurrence in the electronic device can be reduced.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram of an electronic device in a network environment, according to various embodiments;

DETAILED DESCRIPTION

Figure 2:
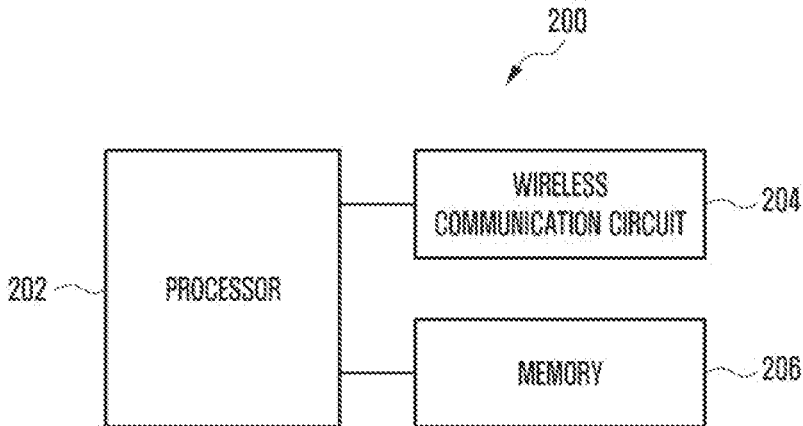
FIG. 2 is a block diagram of an electronic device for transmitting and/or receiving voice data according to various embodiments of the disclosure.

Hereinafter, a more detailed description will be given with reference to the attached drawings.

Figure 1:
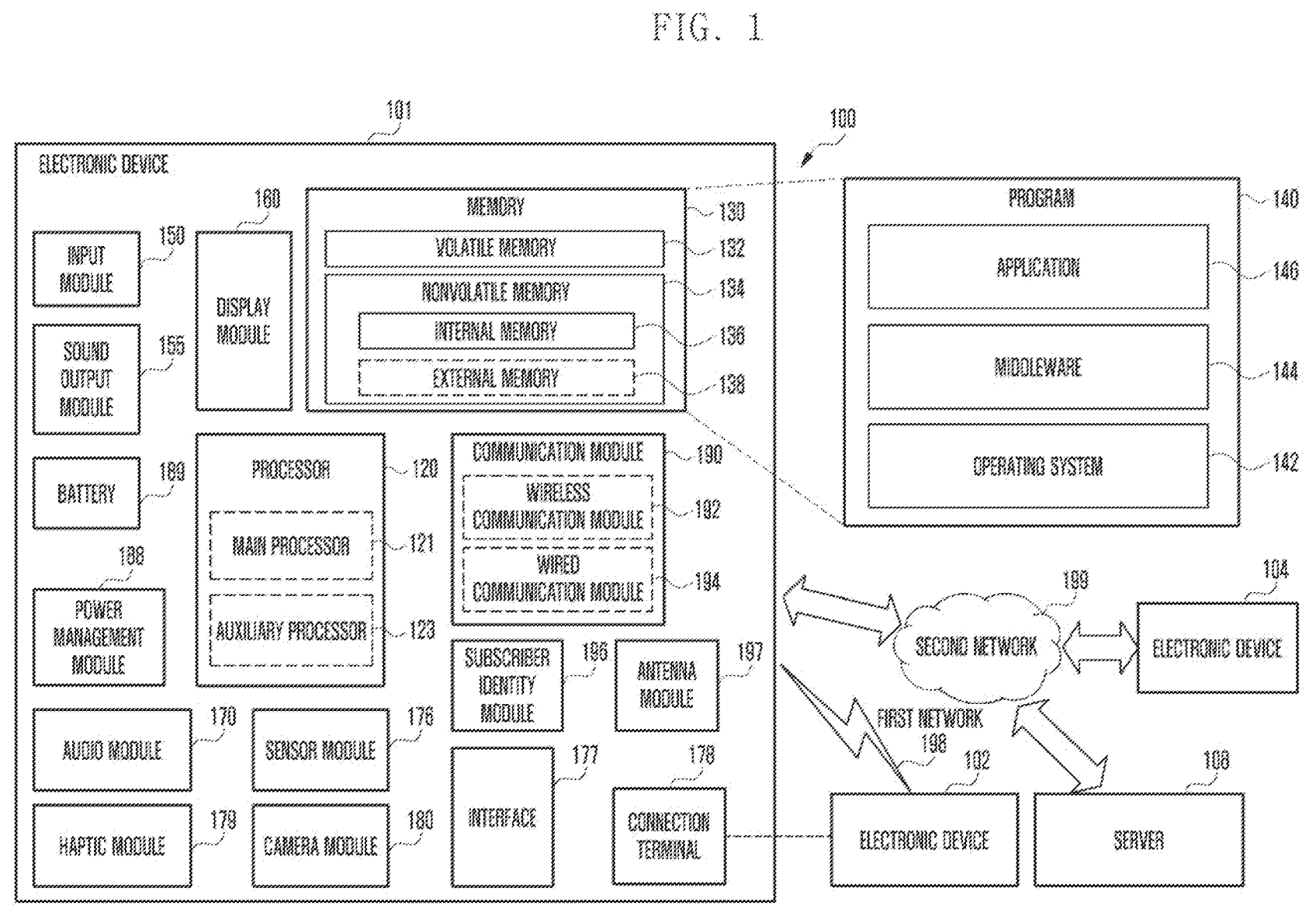

FIG. 1 is a block diagram illustrating an electronic device in a network environment according to an embodiment of the disclosure. Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an high frequency band (e.g., mmWave) antenna module. According to an embodiment, the high frequency band (e.g., mmWave) antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, an electronic device may represent a main device that includes communication control authority among a plurality of electronic devices to which wireless communication (e.g., Bluetooth or Bluetooth low energy (BLE)) is connected. An external electronic device may represent a secondary device that transmits and/or receives data with the electronic device (e.g., the main device), based on the control of an electronic device (e.g., the main device). For example, the electronic device (e.g., the main device) may include a portable electronic device (e.g., a smartphone) or a wearable device (e.g., a wireless earphone) having communication control authority. For example, the external electronic device (e.g., secondary device) may include a wearable device (e.g., wireless earphone) or a portable electronic device (e.g., smart phone) performing communication with an electronic device (e.g., main device), based on the control of the electronic device (e.g., main device).

In the following descriptions, an electronic device and an external electronic device may transmit and/or receive voice data related to a voice call through wireless communication (e.g., Bluetooth or BLE). However, various embodiments of the disclosure may be equally applicable even when an electronic device and an external electronic device transmit and/or receive audio data.

FIG. 2 is a block diagram of an electronic device for transmitting and/or receiving voice data according to various embodiments of the disclosure. According to an embodiment, the electronic device 200 of FIG. 2 may be at least partially similar to the electronic device 101 of FIG. 1 or may further include other embodiments of the electronic device.

Referring to FIG. 2, according to various embodiments, the electronic device 200 may include a processor (e.g., including processing circuitry) 202, a wireless communication circuit 204, and/or a memory 206. According to an embodiment, the processor 202 may be substantially the same as the processor 120 of FIG. 1, or may be included in the processor 120. The wireless communication circuit 204 may be substantially the same as the wireless communication module 192 of FIG. 1, or may be included in the wireless communication module 192. The memory 206 may be substantially the same as the memory 130 of FIG. 1, or may be included in the memory 130.

According to various embodiments, the processor 202 may control the operatively coupled wireless communications circuit 204 and/or memory 206. For example, the processor 202 may include an application processor (AP) or a communication processor (CP).

According to various embodiments, the processor 202 may configure at least one communication variable for transmitting and/or receiving voice data (or audio data) with an external electronic device through the wireless communication circuit 204. According to an embodiment, the processor 202 may establish a communication link with an external electronic device, based on a signal (e.g., an advertising signal) generated by the external electronic device through the wireless communication circuit 204. For example, the processor 202 may establish a communication link with an external electronic device by recognizing that the external electronic device is located around the electronic device 200, based on a signal generated by the external electronic device. For example, the external electronic device may periodically a generate signal (e.g., an advertising signal) for communication connection with the electronic device in a multicast method or a broadcast method in an active state. For another example, when switched to a connection mode (e.g., pairing mode), based on user input, the external electronic device may generate a signal (e.g., an advertising signal) for communication connection with the electronic device in a multicast method or a broadcast method. For example, the signal generated by the external electronic device (e.g., a signal for communication connection with the electronic device) may include at least one of external electronic device identification information, user account information, pairing information, pairing list, detection area, multi-pairing information, battery status information, or transmission power. For example, the pairing information may include information related to whether the external electronic device is currently paired with another electronic device. For example, the pairing list may include information related to an electronic device with which the external electronic device was previously paired. For example, the multi-pairing information may include information related to whether the external electronic device can be paired with multiple electronic devices at the same time.

According to an embodiment, the processor 202 may negotiate at least one communication variable related to a voice call with an external electronic device using a communication link with the external electronic device, established through the wireless communication circuit 204. For example, the processor 202 may negotiate at least one communication variable related to transmission and/or reception of voice data with an external electronic device, based on a synchronous connection protocol (e.g., extended synchronous connection oriented (eSCO)). For example, when establishing the communication link with an external electronic device, the processor 202 may select a codec to be used for transmission and/or reception of voice data with an external electronic device, based on a codec list shared with the external electronic device. For example, the processor 202 may control the wireless communication circuit 204 to transmit a request signal (e.g., link manager (LM) message) containing at least one of a packet type, a packet length, a voice data transmission period (or transmission section) (e.g., $T_{eSCO}$), retransmission section (e.g., $W_{eSCO}$), or information related to synchronization configuration (e.g., $D_{eSCO}$) to an external electronic device. When the processor 202 receives an acceptance signal corresponding to the request signal transmitted to an external electronic device through the wireless communication circuit 204, the processor 202 may configure at least one communication variable related to a voice call with the external electronic device, based on at least one communication variable transmitted to the external electronic device through the request signal. For example, when the processor 202 determines that at least one communication variable among communication variables configured for transmission and/or reception of voice data with an external electronic device is unavailable, the processor 202 may renegotiate at least one communication variable with the external electronic device.

According to various embodiments, the processor 202 may control the wireless communication circuit 204 to transmit and/or receive voice data with an external electronic device, based on at least one communication variable negotiated with the external electronic device. According to an embodiment, when a voice data transmission section arrives, the processor 202 may transmit and/or receive voice data with an external electronic device through the wireless communication circuit 204. For example, the processor 202 may control the wireless communication circuit 204 to transmit first voice data to an external electronic device in a first section among a plurality of time sections included in a transmission section. For example, when there is no voice data to be transmitted from the electronic device 200 to an external electronic device, the first voice data may include null data. For example, the processor 202 may receive second voice data from an external electronic device in a second section among a plurality of time sections included in the transmission section through the wireless communication circuit 204. For example, when there is no voice data to be transmitted from an external electronic device to the electronic device 200, the second voice data may include null data.

According to an embodiment, when it is determined that an error has occurred in voice data transmitted and/or received with an external electronic device, the processor 202 may retransmit the voice data with the external electronic device during a retransmission section. For example, when the processor 202 receives reception failure information (e.g., NACK) corresponding to the voice data transmitted to an external electronic device through the wireless communication circuit 204, the processor 202 may control the wireless communication circuit 204 to retransmit third voice data to the external electronic device during the retransmission section. For example, the reception failure information (e.g., NACK) corresponding to the first voice data may be received in the second section, along with the second voice data. For another example, when the processor 202 does not receive information (e.g., ACK or NACK) related to reception of the voice data transmitted to the external electronic device, the processor 202 may control the wireless communication circuit 204 to retransmit the third voice data to the external electronic device during the retransmission section. For example, when the processor 202 does not receive information (e.g., ACK or NACK) related to reception of the first voice data transmitted to the external electronic device in the first section from the external electronic device in the second section, the processor 202 may determine that the information related to reception of the first voice data (e.g., ACK or NACK) has not been received. For example, the retransmission section may include a portion of the plurality of time sections included in the transmission period of the voice data.

According to various embodiments, the processor 202 may change the packet type of the voice data transmitted to an external electronic device to a packet type not negotiated with the external electronic device in a predefined partial section of the plurality of time sections included in the transmission period of the voice data. For example, the predetermined partial section in which the packet type is changed may be at least one section among the plurality of time sections included in the transmission period of the voice data, and may include the first section, the second section, and/or at least some of the retransmission sections. According to an embodiment, the processor 202 may control the wireless communication circuit 204 to transmit voice data, based on a packet type that has not been negotiated with the external electronic device in the first section (e.g., the third section) of the retransmission section. For example, when the transmission section of voice data arrives, the processor 202 may control the wireless communication circuit 204 to transmit the first voice data of a first packet type (e.g., 2-EV3) negotiated with an external electronic device to the external electronic device in the first section among the plurality of time sections included in the transmission period. When the processor 202 receives reception failure information (e.g., NACK) corresponding to the first voice data transmitted in the first section from the external electronic device in the second section, or does not receive information (e.g., ACK or NACK) related to reception of the first voice data transmitted in the first section from the external electronic device in the second section, the processor 202 may control the wireless communication circuit 204 to retransmit third voice data of a second packet type (e.g., EV3) different from the first packet type to the external electronic device. For example, the information related to the reception of the first voice data may be received from the external electronic device in the second section, together with the second voice data. For example, the third voice data of the second packet type (e.g., EV3) may be retransmitted to the external electronic device in a third section (e.g., first section of the retransmission section). For example, the second packet type may include a packet type having relatively higher transmission power than the first packet type configured through the negotiation with the external electronic device. For example, the retransmitted third voice data may include the same voice information (e.g., $k^{th}$ packet and $(k-1)^{th}$ packet) as the first voice data transmitted to the external electronic device in the first section, or different voice information (e.g., the $k^{th}$ packet). For example, when the processor 202 receives reception failure information (e.g., NACK) corresponding to the third voice data retransmitted in the third section from the external electronic device in a fourth section, or does not receive information (e.g., ACK or NACK) related to reception of the third voice data from the external electronic device in the fourth section, the processor 202 may control the wireless communication circuit 204 to retransmit fifth voice data of the first packet type (e.g., 2-EV3) to the external electronic device in a fifth section. For example, the information related to reception of the third voice data may be received from the external electronic device in the fourth section, together with the fourth voice data. For example, the processor 202 may control the wireless communication circuit 204 to retransmit voice data to an external electronic device, based on the first packet type negotiated with the external electronic device from the second section (e.g., the fourth section) of the retransmission section. For example, the time section may be a basic section for transmitting and/or receiving the voice data, and may include at least one slot. For example, the fifth voice data retransmitted in the fifth section may include the same voice information (e.g., $k^{th}$ packet) as the third voice data or different voice information (e.g., $k^{th}$ packet and $(k-1)^{th}$ packet). For example, the fifth voice data retransmitted in the fifth section may include the same voice information (e.g., $k^{th}$ packet and $(k-1)^{th}$ packet) as the first voice data or different voice information (e.g., $k^{th}$ packet).

According to various embodiments, the processor 202 may change the packet type of the voice data transmitted to an external electronic device, based on wireless communication status information and/or internal resources of the electronic device 200. According to an embodiment, the processor 202 may periodically or continuously determine whether the packet type of the voice data is changed during the transmission section of the voice data, based on the status information of wireless communication and/or the internal resources of the electronic device 200. For example, the internal resources of the electronic device 200 may include power, time, and/or frequency that can be used for wireless communication (e.g., Bluetooth or BLE) with an external electronic device through the wireless communication circuit 204. For example, the internal resources of the electronic device 200 may be configured based on whether the electronic device 200 performs wireless communication (e.g., Bluetooth or BLE) with another electronic device other than the external electronic device and/or are used for other wireless communication (e.g., wireless LAN) in the wireless communication circuit 204.

According to an embodiment, when the status information of the wireless communication and/or the internal resources of the electronic device 200 do not satisfy a designated first condition, the processor 202 may control the wireless communication circuit 204 to transmit the voice data of the first packet type negotiated with the external electronic device to the external electronic device. For example, the designated first condition may include reference information for determining whether to change to a second packet type different from the first packet type while transmitting and/or receiving voice data using the first packet type negotiated between the electronic device 200 and the external electronic device.

According to an embodiment, when the status information of the wireless communication and/or the internal resources of the electronic device 200 satisfy the designated first condition, the processor 202 may determine that the packet type of the voice data is changed. For example, when the processor 202 determines that the packet type of voice data is changed, the processor 202 may control the wireless communication circuit 204 to transmit (or retransmit) the voice data to the external device, based on the second packet type not negotiated with the external electronic device from the next time section within the current transmission period, a predefined time section within the current transmission period, or a predefined time section within the next transmission period. For example, when the processor 202 determines that the packet type of voice data is to be changed, the processor 202 may select at least one radio channel for changing a packet type from among at least one radio channel used for transmitting and/or receiving voice data with an external electronic device. The processor 202 may change the packet type of voice data transmitted through at least one radio channel selected to change the packet type to the second packet type. For example, the status information of wireless communication may include reception sensitivity, noise level of radio channel, retransmission rate of voice data, bit error rate (BER), packet error rate (PER), and/or channel quality driven data rate (CQDDR). For example, the reception sensitivity may include an average of reception sensitivities detected immediately before transmission of voice data or reception sensitivities detected during a predetermined period of time. For example, the noise level of radio channel may include a noise level (or an average of noise levels) of at least one radio channel to be used for transmitting voice data to an external electronic device. For example, the retransmission rate of voice data may be obtained based on the number of retransmissions of the voice data transmitted to an external electronic device for a predetermined period of time. For example, the channel quality driven data rate may be received from an external electronic device or may be identified during wireless communication with the external electronic device by the electronic device 200. For example, the BER and/or PER may include an average of BER and/or PER detected immediately before transmission of voice data or BER and/or PER detected during a certain period of time.

According to an embodiment, when the second packet type is used for transmission and/or reception of voice data, the processor 202 may identify whether the status information of wireless communication and/or the internal resources of the electronic device 200 satisfy a designated second condition. For example, when the status information of wireless communication and/or the internal resources of the electronic device 200 do not satisfy the designated second condition, the processor 202 may control the wireless communication circuit 204 to transmit (or retransmit) voice data to an external electronic device, based on the second packet type. For another example, when the status information of wireless communication and/or the internal resources of the electronic device 200 satisfy the designated second condition, the processor 202 may determine that the packet type of the voice data transmitted to an external electronic device is changed to the first packet type negotiated with the external electronic device. For example, the processor 202 may control the wireless communication circuit 204 to transmit (or retransmit) voice data to the external electronic device, based on the first packet type negotiated with the external electronic device from the next time interval within the current transmission section, the predefined time interval within the current transmission section, or the predefined time interval within the next transmission section. For example, the designated second condition may include reference information for determining whether to change to the first packet type negotiated by the electronic device 200 and the external electronic device while transmitting and/or receiving voice data using the second packet type. For example, the first packet type negotiated with the external electronic device may include one packet type selected through negotiation with the external device for a voice call among a plurality of packet types supportable by the electronic device 200. For example, the plurality of packet types supportable by the electronic device 200 may include high-quality voice (HV)1, HV2, HV3, data-voice (DV), enhanced voice packet (EV)3, 2-EV3, 3-EV3, EV4, EV5, 2-EV5, and/or or 3-EV5.

According to various embodiments, the processor 202 may change the packet length of voice data transmitted to the external electronic device, based on wireless communication status information and/or internal resources of the electronic device 200. According to an embodiment, the processor 202 may periodically or continuously determine whether the packet length of the voice data is changed during the transmission period of the voice data, based on status information of wireless communication and/or internal resources of the electronic device 200.

According to an embodiment, when the status information of the wireless communication and/or the internal resources of the electronic device 200 do not satisfy a designated third condition, the processor 202 may control the wireless communication circuit 204 to transmit (or retransmit) voice data of a first packet length negotiated with the external electronic device to the external electronic device. For example, the designated third condition may include reference information for determining whether to change to a second packet length different from the first packet length while transmitting and/or receiving voice data using the first packet length negotiated by the electronic device 200 and the external electronic device.

According to an embodiment, when the status information of wireless communication and/or the internal resources of the electronic device 200 satisfy the designated third condition, the processor 202 may determine that the packet length of voice data is changed. For example, when the processor 202 determines that the packet type of voice data is to be changed, the processor 202 may control the wireless communication circuit 204 to transmit (or retransmit) voice data to an external electronic device, based on the second packet length not negotiated with the external electronic device from the next time interval within the current transmission period, a predefined time interval within the current transmission period, or a predefined time interval within the next transmission period.

According to an embodiment, when the second packet length is used for transmission and/or reception of voice data, the processor 202 may identify whether the status information of wireless communication and/or internal resources of the electronic device 200 satisfy a designated fourth condition. For example, when the status information of wireless communication and/or the internal resources of the electronic device 200 do not satisfy the designated fourth condition, the processor 202 may control the wireless communication circuit 204 to transmit (or retransmit) voice data to an external electronic device, based on the second packet length. For another example, when the status information of wireless communication and/or the internal resources of the electronic device 200 satisfy the designated fourth condition, the processor 202 may determine that the packet length of the voice data transmitted to the external electronic device is changed to the first packet length negotiated with the external electronic device. For example, the processor 202 may control the wireless communication circuit 204 to transmit voice data to an external electronic device, based on the first packet length negotiated with the external electronic device from the next time interval within the current transmission period, the predefined time interval within the current transmission period, or the predefined time interval within the next transmission period. For example, the designated fourth condition may include reference information for determining whether to change to the first packet length negotiated by the electronic device 200 and the external electronic device while transmitting and/or receiving voice data using the second packet length.

According to various embodiments, the processor 202 may decode voice data received from an external electronic device through the wireless communication circuit 204. According to an embodiment, the processor 202 may discriminate the voice data received from an external electronic device, based on a channel access code (CAC) and/or a logical transport (LT) address of the voice data received through the wireless communication circuit 204. For example, the processor 202 may discriminate the voice data received from an external electronic device, based on the CAC included in the voice data received through the wireless communication circuit 204. For another example, the processor 202 may determine whether the data received from an external electronic device is voice data related to a voice call, based on the LT address included in the data received through the wireless communication circuit 204. According to an embodiment, when the processor 202 discriminates the voice data received from an external electronic device, based on the CAC and/or LT address included in the voice data received through the wireless communication circuit 204, the processor 202 may decode the voice data, based on the packet type information included in a header of the voice data. For example, the CAC may be generated based on a low address part (LAP) of the electronic device 200 having control authority for wireless communication, for the purpose of communication between two electronic devices in a state in which the communication connection between the electronic device 200 and the external electronic device is completed. As an example, the LT address may be a variable for distinguishing a data link (e.g., asynchronous connection-oriented (ACL)) and a voice communication link (e.g., extended synchronous connection-oriented (eSCO)), and may be assigned by the electronic device 200 having control authority for a communication link with an external electronic device.

According to various embodiments, the wireless communication circuit 204 may support wireless communication with an external electronic device. According to an embodiment, the wireless communication circuit 204 may transmit and/or receive data through an established communication link with an external electronic device. As an example, the wireless communication may include Bluetooth and/or Bluetooth low energy (BLE).

According to various embodiments, the memory 206 may store various data used by at least one component (e.g., the processor 202 and/or the wireless communication circuit 204) of the electronic device 200. For example, the data may include information related to reference (e.g., designated first condition, designated second condition, designated third condition, and/or designated fourth condition) for determining whether to change the packet type and/or packet length of the electronic device 200.

According to various embodiments, the electronic device 200 may configure the first packet type (e.g., 2-EV3) to be used through negotiation with the external electronic device. When it is determined that wireless noise occurs and reception quality is degraded, or when it is determined to be a weak electric field situation due to physical obstacles, the electronic device 200 may transmit voice data to the external electronic device using the second packet type (e.g., EV3) not negotiated with the external electronic device. In this case, because the electronic device 200 and the external electronic device transmit voice data in the second packet type (e.g., EV3) having a relatively higher transmission power than the first packet type (e.g., 2-EV3), an effect of strengthening against radio interference and an effect of increasing a distance can be obtained, compared to the case of using the first packet type.

According to various embodiments, when the electronic device 200 (or the external electronic device) is a portable electronic device, the electronic device 200 (or the external electronic device) may transmit the voice data successfully received from the external electronic device (or the electronic device 200) to a separate electronic device (e.g., electronic device 104 of FIG. 1) in which a communication link (e.g., cellular communication method) for voice communication with the electronic device 200 (or an external electronic device) is established.

According to various embodiments, when the electronic device 200 (or external electronic device) is a wearable device (e.g., wireless earphone), the electronic device 200 (or an external electronic device) may externally output voice data successfully received from the external electronic device (or the electronic device 200) through an audio output device (e.g., sound output module 155 of FIG. 1).

According to various embodiments, the external electronic device may transmit voice data in the same manner as the electronic device 200 except that the timing at which the voice data is transmitted is different from that of the electronic device 200. According to an embodiment, the external electronic device may receive first voice data from the electronic device 200 through a first section among a plurality of time sections of a transmission period of voice data. The external electronic device may transmit information related to reception of the first voice data and second voice data collected by the external electronic device to the electronic device 200 through the second section. For example, the information related to reception of the first voice data may include reception success information (e.g., ACK) or reception failure information (e.g., NACK) of the first voice data.

According to various embodiments, an external electronic device may include a plurality of external electronic devices. According to an embodiment, when the external electronic device is a wearable device (e.g., a wireless earphone), the external electronic device may include a first external electronic device (e.g., a left wireless earphone) and a second external electronic device (e.g., a right wireless earphone).

According to an embodiment, the first external electronic device and the second external electronic device may establish a separate link (e.g., an eSCO link) with the electronic device 200. For example, the first external electronic device may establish a first link with the electronic device 200, and may configure at least one communication variable related to a voice call. For another example, the second external electronic device may establish a second link different from the first link with the electronic device 200, and may configure at least one communication variable related to a voice call.

According to an embodiment, the first external electronic device having control authority between the first external electronic device and the second external electronic device may establish the first link with the electronic device 200. The first external electronic device may establish a third link different from the first link with the second external electronic device. For example, the first external electronic device may establish the third link with the second external electronic device, based on a signal (e.g., advertising signal) generated by the second external electronic device. For another example, the first external electronic device may establish the third link with the second external electronic device, based on a sniffing method. For example, the first external electronic device may share information (e.g., CAC and/or LT address) related to the first link with the electronic device 200 with the second external electronic device, based on the sniffing method. The second external electronic device may sniff the first link between the electronic device 200 and the first external electronic device, based on the information related to the first link received from the first external electronic device.

According to an embodiment, the second external electronic device may receive voice data transmitted from the electronic device 200 by sniffing the first link. The second external electronic device may transmit information (e.g., ACK or NACK) related to the reception of voice data received from the electronic device 200 to the electronic device 200, based on information related to the first communication link received from the first external electronic device. For example, when the second external electronic device successfully receives voice data from the electronic device 200, the second external electronic device may transmit reception success information (e.g., ACK) corresponding to the voice data to the electronic device 200. For another example, when an error occurs in the voice data received from the electronic device 200 or the voice data is not received from the electronic device 200, the second external electronic device may transmit reception failure information (e.g., NACK) corresponding to the voice data to the electronic device 200. For example, the second external electronic device may transmit the information (e.g., ACK or NACK) related to receiving the voice data to the electronic device 200 separately from the first external electronic device.

According to an embodiment, when receiving the reception failure information (e.g., NACK) corresponding to the voice data from the second external electronic device through the first communication link, the electronic device 200 may retransmit the voice data. For example, when receiving the reception failure information (e.g., NACK) corresponding to the voice data from the second external electronic device rather than the first electronic device, the electronic device 200 may retransmit the voice data.

According to various embodiments, an electronic device (e.g., the electronic device 101 of FIG. 1 or the first electronic device 200 of FIG. 2) may include a communication circuit (e.g., wireless communication module 192 of FIG. 1 or wireless communication circuit 204 of FIG. 2), and at least one processor (e.g., processor 120 of FIG. 1 or processor 202 of FIG. 2) operatively coupled with the communication circuit, and the processor may establish communication with an external electronic device through the communication circuit, may configure a first packet type for transmission and/or reception of voice data through negotiation with the external electronic device, may transmit first voice data to the external electronic device, based on the first packet type, and may retransmit second voice data to the external electronic device, based on a second packet type different from the first packet type when reception failure information corresponding to the first voice data is received from the external electronic device or information related to reception of the first voice data is not received.

According to various embodiments, when reception failure information corresponding to the second voice data of the second packet type is received from the external electronic device, the processor may be configured to retransmit third voice data to the external electronic device, based on the first packet type.

According to various embodiments, the second voice data and the third voice data may include the same voice information or different voice information.

According to various embodiments, the first voice data and the third voice data may include the same voice information or different voice information.

According to various embodiments, the processor may be configured to retransmit fourth voice data to the external electronic device, based on the second packet type when receiving the reception failure information corresponding to the second voice data of the second packet type from the external electronic device.

According to various embodiments, the second voice data and the fourth voice data may include the same voice information or different voice information.

According to various embodiments, the first voice data and the fourth voice data may include the same voice information or different voice information.

According to various embodiments, the first packet type may include information related to a modulation method and/or a packet length configured through negotiation with the external device for transmission of voice data, and the second packet type may include information related to a modulation method and/or packet length different from the modulation method and/or packet length included in the first packet type.

According to various embodiments, the first packet type may include one of high-quality voice (HV)1, HV2, HV3, data-voice (DV), enhanced voice packet (EV) 3, 2-EV3, 3-EV3, EV4, EV5, 2-EV5, and 3-EV5, and the second packet type may include one of the high-quality voice (HV)1, HV2, HV3, data-voice (DV), enhanced voice packet (EV)3, 2-EV3, 3-EV3, EV4, EV5, 2-EV5, and 3-EV5, other than the first packet type.

According to various embodiments, the processor may be configured to decode fifth voice data of the first packet type received together with the reception failure information corresponding to the first voice data from the external electronic device through the communication circuit, and to transmit information related to reception of the fifth voice data to the external electronic device.

According to various embodiments, the processor may be configured to transmit the information related to reception of the fifth voice data to the external electronic device, based on the second packet type, together with the second voice data.

According to various embodiments, the processor may be configured to receive sixth voice data of the second packet type from the external electronic device through the communication circuit when transmitting reception failure information corresponding to the fifth voice data to the external electronic device.

According to various embodiments, the first voice data and the second voice data may include the same voice information or different voice information.

According to various embodiments, an electronic device (e.g., the electronic device 101 of FIG. 1 or the first electronic device 200 of FIG. 2) may include a communication circuit (e.g., wireless communication module 192 of FIG. 1 or wireless communication circuit 204 of FIG. 2) and at least one processor (e.g., the processor 120 or the processor 202 of FIG. 2) operatively connected to the communication circuit, and the processor may establish communication with an external electronic device through the communication circuit, may configure a first packet type for transmission and/or reception of data through negotiation with the external electronic device, may identify a radio channel with the external electronic device, may transmit first voice data to the external electronic device, based on the first packet type when the radio channel does not satisfy a designated first condition, and may transmit second voice data to the external electronic device, based on a second packet type different from the first packet type when the radio channel satisfies the designated first condition.

According to various embodiments, the radio channel may include reception sensitivity, noise level of the radio channel, bit error rate (BER), packet error rate (PEP), voice data retransmission rate, and/or channel quality-centered data rate (CQDDR: channel quality driven data rate).

According to various embodiments, when the second voice data is transmitted to the external electronic device, based on the second packet type, the processor may discriminate status information of wireless communication with the external electronic device, may transmit third voice data to the external electronic device, based on the second packet type when the status information of the wireless communication does not satisfy a designated second condition, and may transmit fourth voice data to the external electronic device, based on the first packet type when the status information of the wireless communication satisfies a designated second condition.

According to various embodiments, the communication circuit may support a Bluetooth or Bluetooth low energy (BLE) method.

Figure 3:
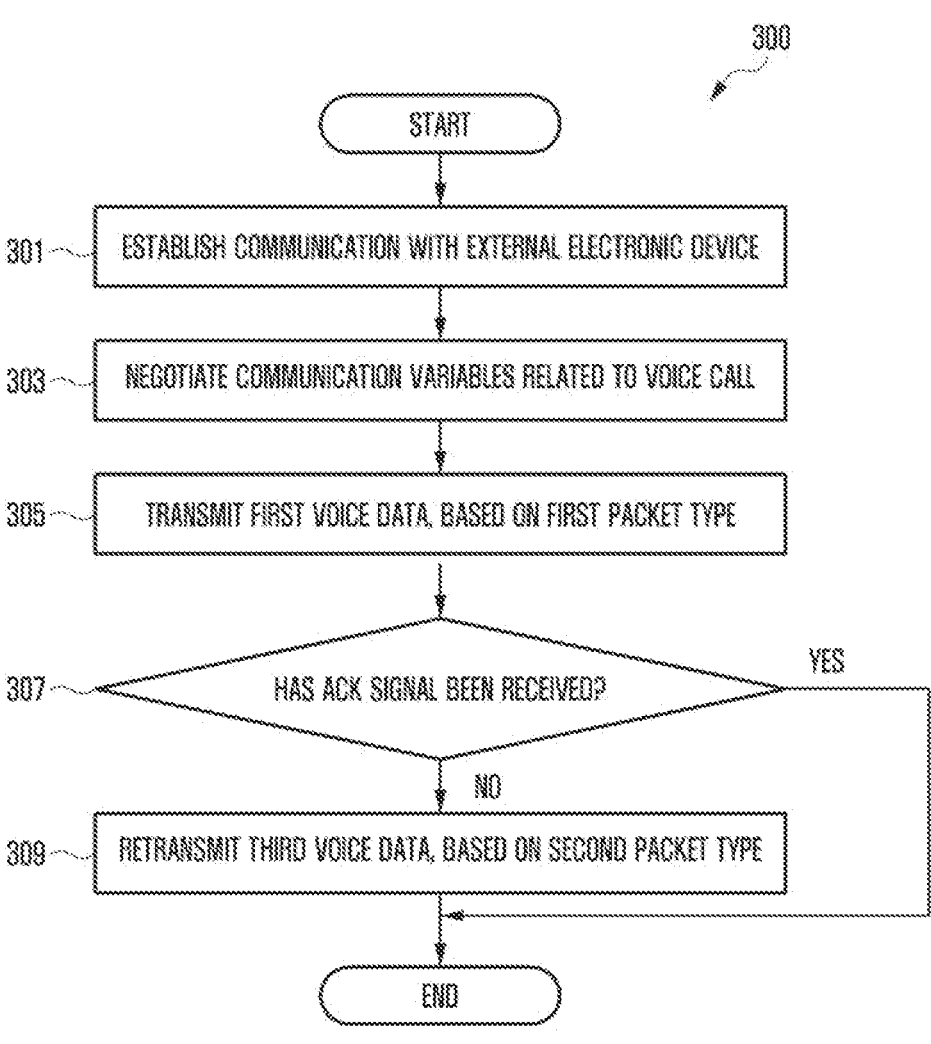
FIG. 3 is a flowchart for transmitting voice data in an electronic device according to various embodiments of the disclosure.
Figure 5:
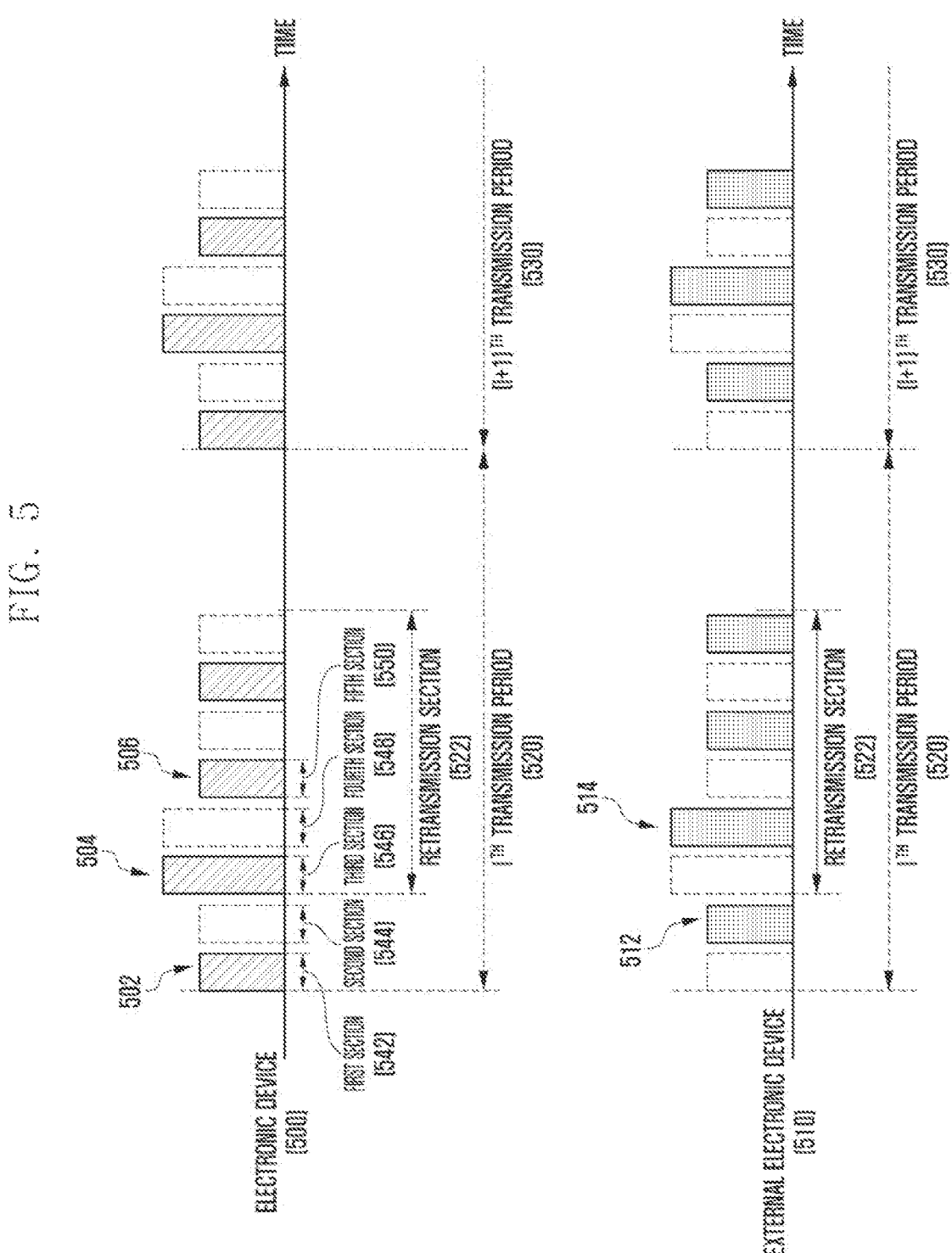
FIG. 5 illustrates an example of changing a packet type at a fixed location in an electronic device and an external electronic device according to various embodiments of the disclosure.

FIG. 3 is a flowchart for transmitting voice data in an electronic device according to various embodiments of the disclosure. Operations in the following embodiments may be performed sequentially, but are not necessarily performed sequentially. For example, the order of the operations may be changed, or at least two operations may be performed in parallel. For example, the electronic device of FIG. 3 may be the electronic device 101 of FIG. 1 or the first electronic device 200 of FIG. 2. As an example, at least some components of FIG. 3 will be described with reference to FIG. 5. FIG. 5 illustrates an example of changing a packet type at a fixed location in an electronic device and an external electronic device according to various embodiments of the disclosure.

Referring to FIG. 3, according to various embodiments, the electronic device (e.g., the processor 120, the wireless communication circuit 192 of FIG. 1, the processor 202 or the wireless communication circuit 204 of FIG. 2) may establish communication with an external electronic device, in operation 301. According to an embodiment, when the processor 202 receives a signal (e.g., advertising signal) transmitted by the external electronic device through the wireless communication circuit 204, the processor 202 may recognize an external electronic device, based on a signal received from the external electronic device. The processor

202 may control a display module (e.g., the display module 160 of FIG. 1) of the electronic device 200 to output a graphic user interface related to the connection with the external electronic device, based on the signals received from the external electronic device. For example, when the external electronic device is not registered in the electronic device 200, the processor 202 may control the display module to output a graphic user interface including a menu (e.g., a connection menu and/or a rejection menu) for configuring whether to establish the communication with the external electronic device. For example, the processor 202 may control the wireless communication circuit 204 to establish a communication link with an external electronic device when an input related to a connection menu (e.g., connect) is detected. As another example, the processor 202 may control the wireless communication circuit 204 not to establish a communication link with an external electronic device when an input related to a rejection menu (e.g., dismiss) is detected. For another example, when the external electronic device is registered to the electronic device 200, the processor 202 may control the display module to output a graphic user interface including status information (e.g., battery status information and/or volume information) of the external electronic device.

According to various embodiments, in operation 303, the electronic device (e.g., the processor 120 or 202 or the wireless communication circuit 192 or 204) may negotiate at least one communication variable related to a voice call with an external electronic device. According to an embodiment, the processor 202 may determine at least one communication variable for transmitting and/or receiving voice data through negotiation with an external electronic device to which a communication link is established through the wireless communication circuit 204. For example, the processor 202 may control the wireless communications circuit 204 to transmit a request signal (e.g., a link manager (LM) message) including at least one communication variable configured by the electronic device 200 to an external electronic device. When receiving an acceptance signal corresponding to the request signal from the external electronic device, the processor 202 may configure at least one communication variable configured in the electronic device 200 as a communication variable for transmitting and/or receiving voice data with an external electronic device. For example, the at least one communication variable may include at least one of a packet type, a packet length, a transmission period (or transmission section) of voice data (e.g., $T_{eSCO}$), a retransmission section (e.g., $W_{eSCO}$), or information (e.g., $D_{eSCO}$) related to synchronization configuration.

According to various embodiments, in operation 305, the electronic device (e.g., the processor 120 or 202 or the wireless communication circuit 192 or 204) may transmit first voice data to the external electronic device, based on a first packet type negotiated with the external electronic device. According to an embodiment, referring to FIG. 5, when the i$^{th}$ transmission period 520 arrives, the processor 202 may control the wireless communication circuit 204 to transmit the first voice data 502 of the first packet type (e.g., 2-EV3) negotiated with the external electronic device 510 in a first section 542 to the external electronic device 510.

According to various embodiments, in operation 307, the electronic device (e.g., the processor 120 or 202 or the wireless communication circuit 192 or 204) may identify whether reception success information (ACK) related to the first voice data transmitted to the external electronic device is received. According to an embodiment, the electronic device 500 may receive information (e.g., NACK or ACK) related to reception of the first voice data 502 and/or second voice data 512 from the external electronic device 510 in a second section 544. According to an embodiment, the external electronic device 510 may decode the first voice data 502 of the first packet type (e.g., 2-EV3) received from the electronic device 500 in the first section 542. For example, when an error is detected in the first voice data 502 received from the electronic device 500, the external electronic device 510 may transmit reception failure information (NACK) related to the first voice data 502 to the electronic device 500. For example, the error of the first voice data 502 may include a header error control (HEC) error due to header corruption of the first voice data 502 and/or a cyclical redundancy check (CRC) error due to payload corruption of the first voice data 502. For another example, when no error is detected in the first voice data 502 received from the electronic device 500, the external electronic device 510 may determine that the reception of the first voice data 502 is successful. In this case, the external electronic device 510 may transmit the reception success information (ACK) related to the first voice data 502 to the electronic device 500. According to an embodiment, the external electronic device 510 may transmit the information (e.g., NACK or ACK) related to the reception of the first voice data 502 to the electronic device 500 in the second section 544, along with the second voice data 512 of the first packet type (e.g., 2-EV3) corresponding to the voice information collected by the external electronic device 510.

According to various embodiments, when the electronic device receives the reception success information (ACK) related to the first voice data transmitted to the external electronic device (e.g., 'Yes' in operation 307), the electronic device (e.g., the processor 120 or 202 or the wireless communication circuit 192 or 204) may determine that the first voice data has been successfully received by the external electronic device.

According to various embodiments, when the reception failure information (NACK) related to the first voice data transmitted to the external electronic device is received or when the information (e.g., ACK or NACK) related to the reception of the first voice data is not received (e.g., 'No' in operation 307), the electronic device (e.g., the processor 120 or 202 or the wireless communication circuit 192 or 204) may retransmit third voice data to the external electronic device, based on the second packet type different from the first packet type, in operation 309. According to an embodiment, when the retransmission section 522 of the i$^{th}$ transmission period 520 arrives, the processor 202 may control the wireless communication circuit 204 to retransmit third voice data 504 of the second packet type (e.g., EV3) different from the first packet type (e.g., 2-EV3) negotiated with the external electronic device 510 to the external electronic device 510 in a third section 546. According to an embodiment, the processor 202 may transmit information (e.g., NACK or ACK) related to reception of the second voice data 512 to the external electronic device 510 in the third section 546, along with the third voice data 504 of the second packet type. For example, when an error is detected in the second voice data 512 received from the external electronic device 510, the information related to the reception of the second voice data 512 may include reception failure information (NACK) related to the second voice data 512. For another example, when an error is not detected in the second voice data 512 received from the external electronic device 510, the information related to the reception of the second voice data 512 may include reception success information (ACK) related to the second voice data 512.

According to an embodiment, the voice information included in the first voice data 502 and the third voice data 504 may be the same as or different from each other. For example, the first voice data 502 may include a k$^{th}$ packet and a (k−1)$^{th}$ packet, based on the first packet type (e.g., 2-EV3). The third voice data 504 may include a k$^{th}$ packet, based on the second packet type (e.g., EV3). That is, the third voice data 504 may include at least a part (e.g., the k$^{th}$ packet) of the voice information included in the first voice data 502, based on the second packet type. For another example, the first voice data 502 and the second voice data 504 may include the k$^{th}$ packet, or the k$^{th}$ packet and (k−1)$^{th}$ packet.

Figure 4:
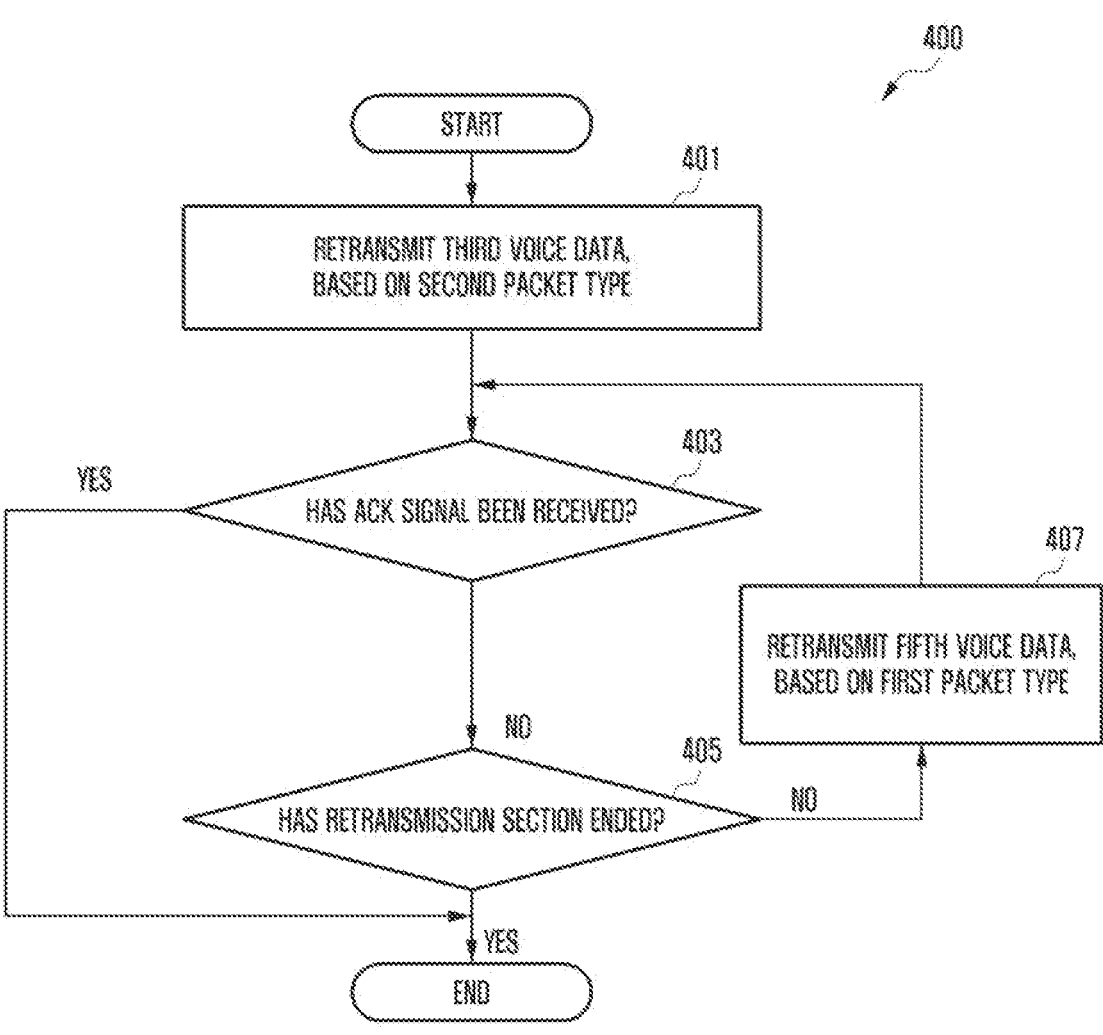
FIG. 4 is a flowchart for retransmitting voice data in an electronic device according to various embodiments of the disclosure.

FIG. 4 is a flowchart for retransmitting voice data in an electronic device according to various embodiments of the disclosure. According to an embodiment, operations of FIG. 4 may be additional operations of the operation 309 of FIG. 3. The operations in the following embodiments may be performed sequentially, but are not necessarily performed sequentially. For example, the order of the operations may be changed, or at least two operations may be performed in parallel. For example, the electronic device of FIG. 4 may be the electronic device 101 of FIG. 1 or the first electronic device 200 of FIG. 2. As an example, at least some components of FIG. 4 will be described with reference to FIG. 5.

Referring to FIG. 4, according to various embodiments, when reception failure information (NACK) related to the first voice data transmitted to the external electronic device is received or information related to reception of the first voice data is not received (e.g., 'No' in operation 307 of FIG. 3), in operation 401, the electronic device (e.g., processor 120, wireless communication circuit 192 of FIG. 1, processor 202 or wireless communication circuit 204 of FIG. 2) may retransmit third voice data to the external electronic device, based on a second packet type that is not negotiated with the external electronic device and is different from the first packet type. According to an embodiment, referring to FIG. 5, in the second section 544, when reception failure information (NACK) corresponding to the first voice data 502 is received from the external electronic device 510, or information (ACK or NACK) related to reception of the first voice data 502 is not received, the processor 202 may control the wireless communication circuit 204 to retransmit the third voice data 504 of the second packet type (e.g., EV3) that is not negotiated with the external electronic device 510 to the external electronic device 510 in the third section 546.

According to various embodiments, in operation 403, the electronic device (e.g., processor 120 or 202 or wireless communication circuit 192 or 204) may identify whether reception success information (ACK) related to the third voice data retransmitted to the external electronic device is received. According to an embodiment, the electronic device 500 may receive the information (e.g., NACK or ACK) related to the reception of the third voice data 504 and/or fourth voice data 514 from the external electronic device 510 in a fourth section 548. According to an embodiment, the external electronic device 510 may decode the third voice data 504 of the second packet type (e.g., EV3) received from the electronic device 500 in the third section 546. For example, when an error is detected in the third voice data 504 received from the electronic device 500, the external electronic device 510 may transmit reception failure information (NACK) related to the third voice data 504 to the electronic device 500 in the fourth section 548. For another example, when an error is not detected in the third voice data 504 received from the electronic device 500, the external electronic device 510 may transmit the reception success information (ACK) related to the third voice data 504 to the electronic device 500 in the fourth section 500. According to an embodiment, when the external electronic device 510 receives reception failure information (NACK) related to the second voice data 512 from the electronic device 500, the external electronic device 510 may retransmit information (e.g., NACK or ACK) related to reception of the third voice data 504 to the electronic device 500 in the fourth section 548, together with fourth voice data 514 of the second packet type (e.g., EV3). According to an embodiment, when the external electronic device 510 receives the reception success information (ACK) related to the second voice data 512 from the electronic device 500, the external electronic device 510 may transmit the information (e.g., NACK or ACK) related to reception of the third voice data 504 to the electronic device 500 in the fourth section 548. For example, the fourth voice data 514 may include the same voice information (e.g., the $k^{th}$ packet) as the second voice data 512 or different voice information (e.g., the $k^{th}$ packet and the $(k-1)^{th}$ packet).

According to various embodiments, when the electronic device receives the reception success information (ACK) related to the third voice data retransmitted to the external electronic device (e.g., 'Yes' in operation 403), the electronic device (e.g., the processor 120 or 202 or the wireless communication circuit 192 or 204) may determine that transmission of voice data to the external electronic device has been completed.

According to various embodiments, when reception failure information (NACK) related to the third voice data retransmitted to the external electronic device is received, or when information (ACK or NACK) related to reception of the third voice data is not received (e.g., 'No' in operation 403), the electronic device (e.g., the processor 120 or 202 or the wireless communication circuit 192 or 204) may identify whether the retransmission period ends, in operation 405. According to an embodiment, the processor 202 may identify whether the retransmission section 522 of the $i^{th}$ transmission period 520 for retransmitting the third voice data 504 is ended.

According to various embodiments, when the retransmission section is not ended (e.g., 'No' in operation 405), in operation 407, the electronic device (e.g., the processor 120 or 202 or the wireless communication circuit 192 or 204) may retransmit fifth voice data to the external electronic device, based on the first packet type negotiated with the external electronic device. According to an embodiment, when the reception failure information (NACK) corresponding to the third voice data 504 retransmitted to the external electronic device 510 is received, the processor 202 may control the wireless communication circuit 204 to retransmit the fifth voice data 506 of the first packet type (e.g., 2-EV3) negotiated with the external electronic device 510 in the fifth section 550 to the external electronic device 510. According to an embodiment, the voice information included in the third voice data 504 and the fifth voice data 506 may be the same as or different from each other. For example, the third voice data 504 may include the $k^{th}$ packet, based on the second packet type (e.g., EV3). The fifth voice data 506 may include the $k^{th}$ packet and the $(k-1)^{th}$ packet, based on the first packet type (e.g., 2-EV3). For example, the fifth voice data 506 may include the same voice information (e.g., the $k^{th}$ packet) as the third voice data 504 or different voice information (e.g., the $k^{th}$ packet and the $(k-1)^{th}$ packet). For example, the fifth voice data 506 may include the same voice information (e.g., the $k^{th}$ packet and the $(k-1)^{th}$ packet) as the first voice data 502 or different voice information (e.g., the $k^{th}$ packet).

According to various embodiments, when the retransmission section is ended (e.g., 'Yes' in operation 405), the electronic device (e.g., the processor 120 or 202 or the wireless communication circuit 192 or 204) may determine that transmission of the first voice data to the external electronic device has failed.

According to various embodiments, when the electronic device 200 configures the packet type of voice data to the first packet type (e.g., 2-EV3) through negotiation with the external electronic device, the electronic device 200 may retransmit the voice data to the external electronic device using the second packet type (e.g., EV3) in a partial time section (e.g., the third section 546 of FIG. 5) of the retransmission section (e.g., the retransmission section 522 of FIG. 5). In this case, since the electronic device 200 transmits the voice data in the second packet type (e.g., EV3) having relatively higher transmit power than the first packet type (e.g., 2-EV3), it is possible to increase the probability of successful transmission of the voice data by obtaining an effect of being stronger against radio interference and an effect of increasing a distance than when using the first packet type.

Figure 6:
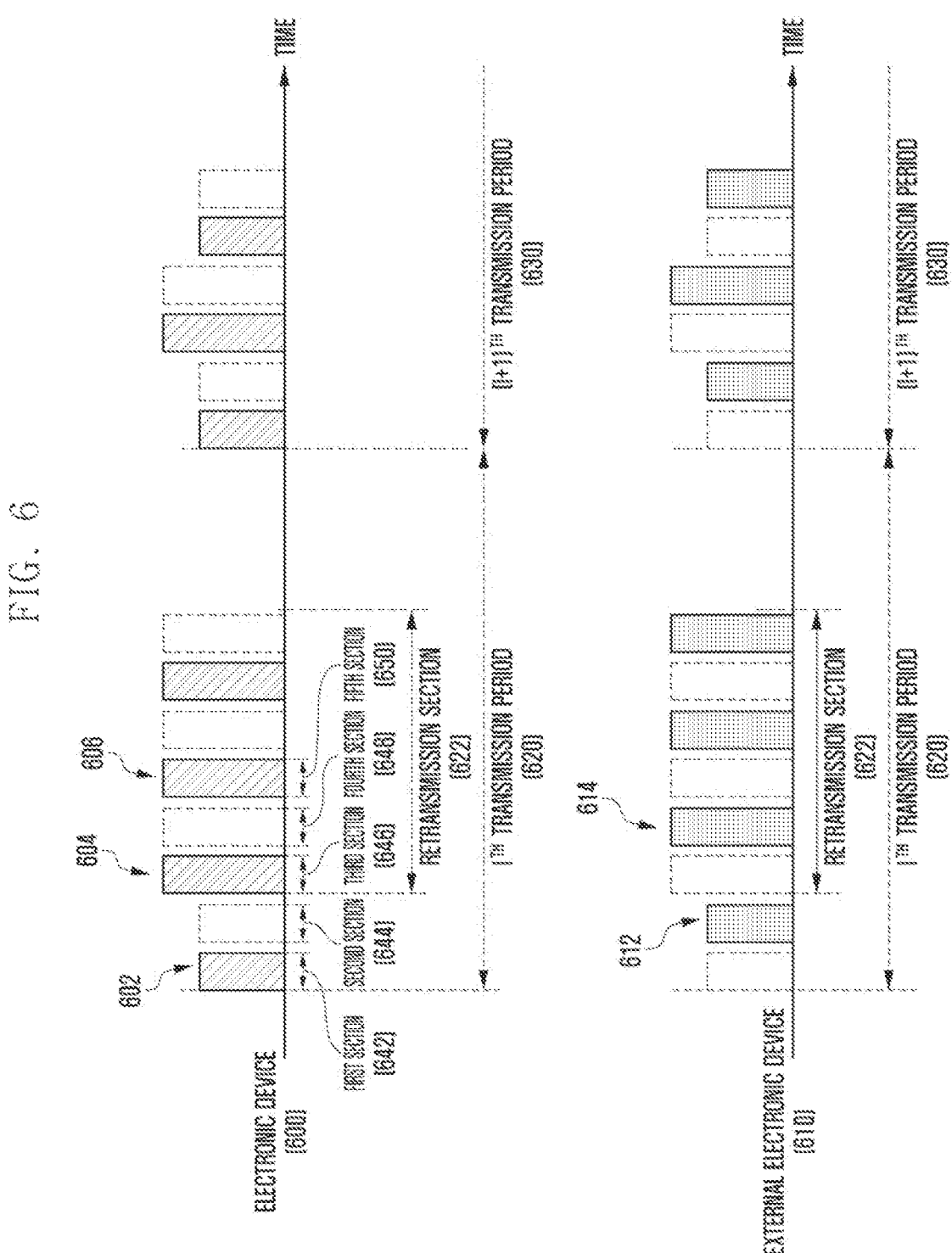
FIG. 6 illustrates another example of changing a packet type at a fixed location in an electronic device and an external electronic device according to various embodiments of the disclosure.

According to various embodiments, when the electronic device 200 receives the reception failure information corresponding to the first voice data of the first packet type (e.g., 2-EV3) negotiated with the external electronic device, the electronic device 200 may retransmit the voice data to the external electronic device using the second packet type (e.g., EV3) different from the first packet type during the retransmission section, as shown in FIG. 6.

FIG. 6 illustrates another example of changing a packet type at a fixed location in an electronic device and an external electronic device according to various embodiments of the disclosure.

According to various embodiments, when an $i^{th}$ transmission period 620 arrives, the electronic device 600 may transmit first voice data 602 of a first packet type (e.g., 2-EV3) negotiated with an external electronic device 610 to the external electronic device 610 in a first section 642.

According to various embodiments, the electronic device 600 may receive information (e.g., NACK or ACK) related to reception of the first voice data 602 and/or second voice data 612 from the external electronic device 610 in a second section 644. According to an embodiment, the external electronic device 610 may decode the first voice data 602 received from the electronic device 600 in the first section 642. According to an embodiment, the external electronic device 610 may transmit information (ACK or NACK) related to the reception of the first voice data 602 to the electronic device 600 in the second period 644. For example, when an error is detected in the first voice data 602, the external electronic device 610 may transmit reception failure information (NACK) related to the first voice data 602 to the electronic device 600. For another example, when the external electronic device 610 does not detect an error in the first voice data 602, the external electronic device 610 may transmit reception success information (ACK) related to the first voice data 602 to the electronic device 600. According to an embodiment, the external electronic device 610 may transmit information (e.g., NACK) related to the reception of the first voice data 602 to the electronic device 600 in the second section 644, along with the second voice data 612 of the first packet type (e.g., 2-EV3) corresponding to the voice information collected by the external electronic device 610.

According to various embodiments, when the reception failure information (NACK) corresponding to the first voice data 602 is received from the external electronic device 610 or the information related to reception of the first voice data 602 (ACK or NACK) is not received in the second section 644, the electronic device 600 may retransmit third voice data 604 of a second packet type (e.g., EV3) different from the first packet type to the external electronic device 610 during a retransmission section 622. According to an embodiment, when the retransmission section 622 of the i$^{th}$ transmission period 620 arrives, the electronic device 600 may transmits the third voice data 604 of the second packet type (e.g., EV3) different from the first packet type (e.g., 2-EV3) negotiated with the external electronic device 610 to the external electronic device 610 in the third section 646. For example, the electronic device 600 may transmit information (e.g., NACK) related to reception of the second voice data 612 to the external electronic device 610 in the third section 646, along with the third voice data 604 of the second packet type. For example, the third voice data 604 may include the same voice information (e.g., the k$^{th}$ packet and the (k−1)$^{th}$ packet) as the first voice data 602 or different voice information (e.g., the k$^{th}$ packet).

According to various embodiments, the electronic device 600 may receive information (e.g., NACK or ACK) related to reception of the third voice data 604 and/or fourth voice data 614 from the external electronic device 610 in a fourth section 648. According to an embodiment, the external electronic device 610 may decode the third voice data 604 of the second packet type (e.g., EV3) received from the electronic device 600 in the third section 646. According to an embodiment, when an error is detected in the third voice data 604 received from the electronic device 600, the external electronic device 610 may transmit reception failure information (NACK) related to the third voice data 604 to the electronic device 600 in the fourth section 648. For example, when the external electronic device 610 receives the reception failure information (NACK) related to the second voice data 612 from the electronic device 600, the external electronic device 610 may transmit the reception failure information (NACK) of the third voice data 604 to the electronic device 600 in the fourth section 648, together with the fourth voice data 614 of the second packet type (e.g., EV3).

According to various embodiments, when the electronic device 600 receives the reception failure information (NACK) corresponding to the third voice data 604 retransmitted to the external electronic device 610, the electronic device 600 may retransmit fifth voice data 606 of the second packet type (e.g., EV3) different from the first packet type (e.g., 2-EV3) negotiated with the external electronic device 610 to the external electronic device 610 in a fifth section 650. For example, the electronic device 600 may transmit information (e.g., NACK) related to reception of the fourth voice data 614 to the external electronic device 610 in the fifth section 650, together with the fifth voice data 606 of the second packet type. For example, the fifth voice data 606 may include the same voice information (e.g., the k$^{th}$ packet) as the third voice data 604 or different voice information (e.g., the k$^{th}$ packet and the (k−1)$^{th}$ packet). For example, the fifth voice data 606 may include the same voice information (e.g., the k$^{th}$ packet and the (k−1)$^{th}$ packet) as the first voice data 602 or different voice information (e.g., the k$^{th}$ packet).

Figure 7:
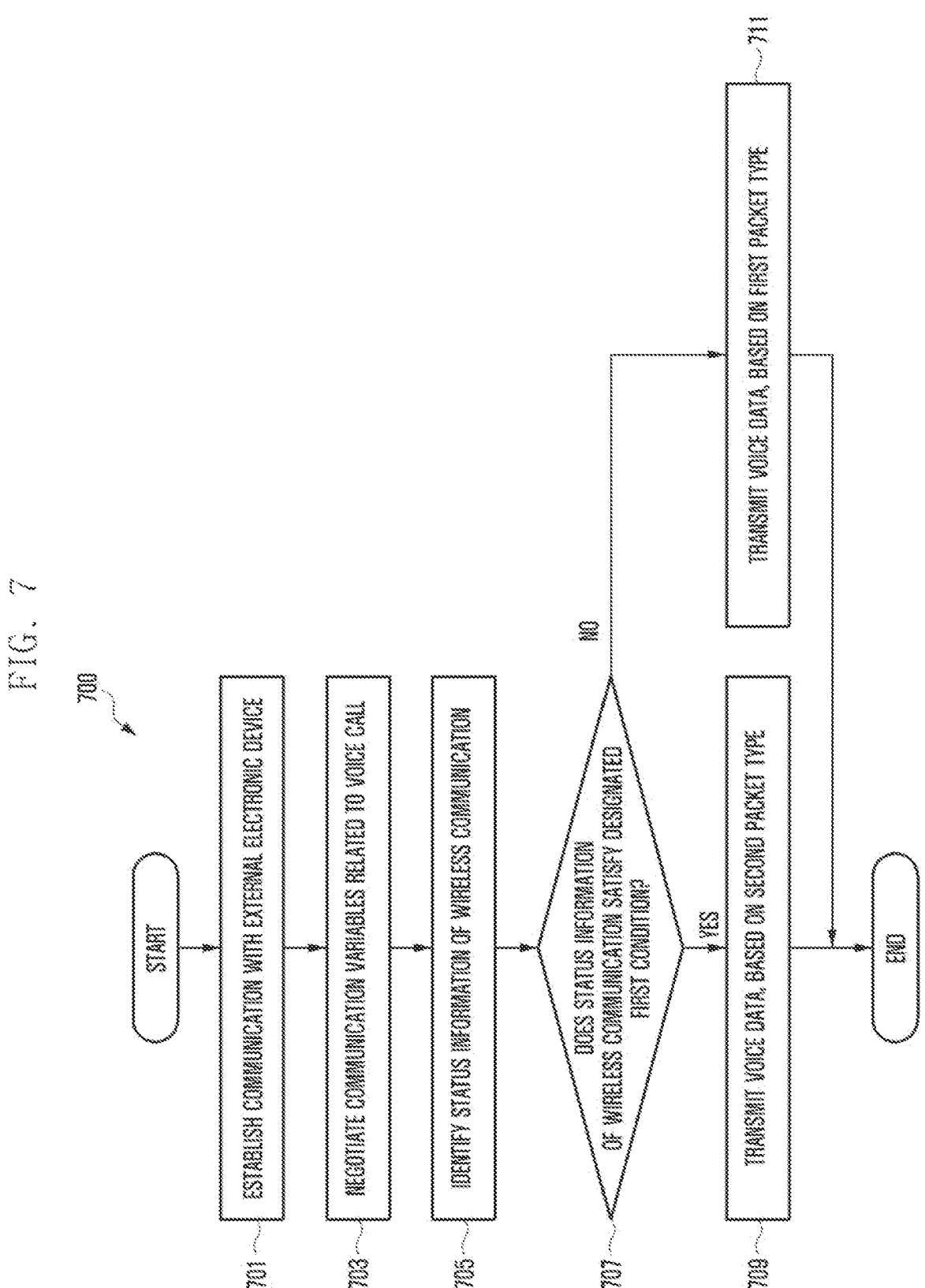
FIG. 7 is a flowchart for transmitting voice data, based on status information of wireless communication in an electronic device according to various embodiments of the disclosure.
Figure 9:
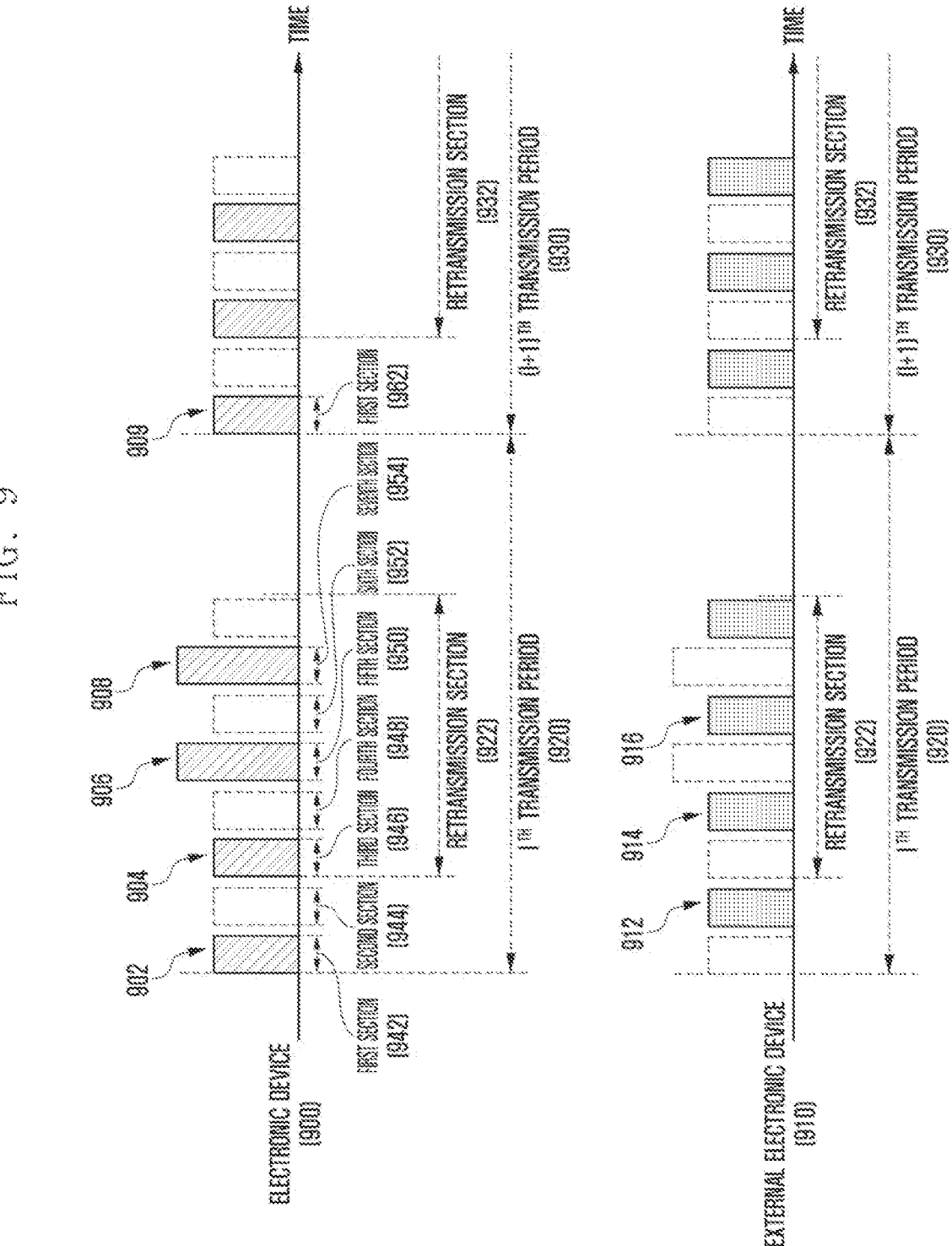
FIG. 9 illustrates an example for changing a packet type, based on status information of wireless communication in an electronic device and an external electronic device according to various embodiments of the disclosure.
Figure 10:
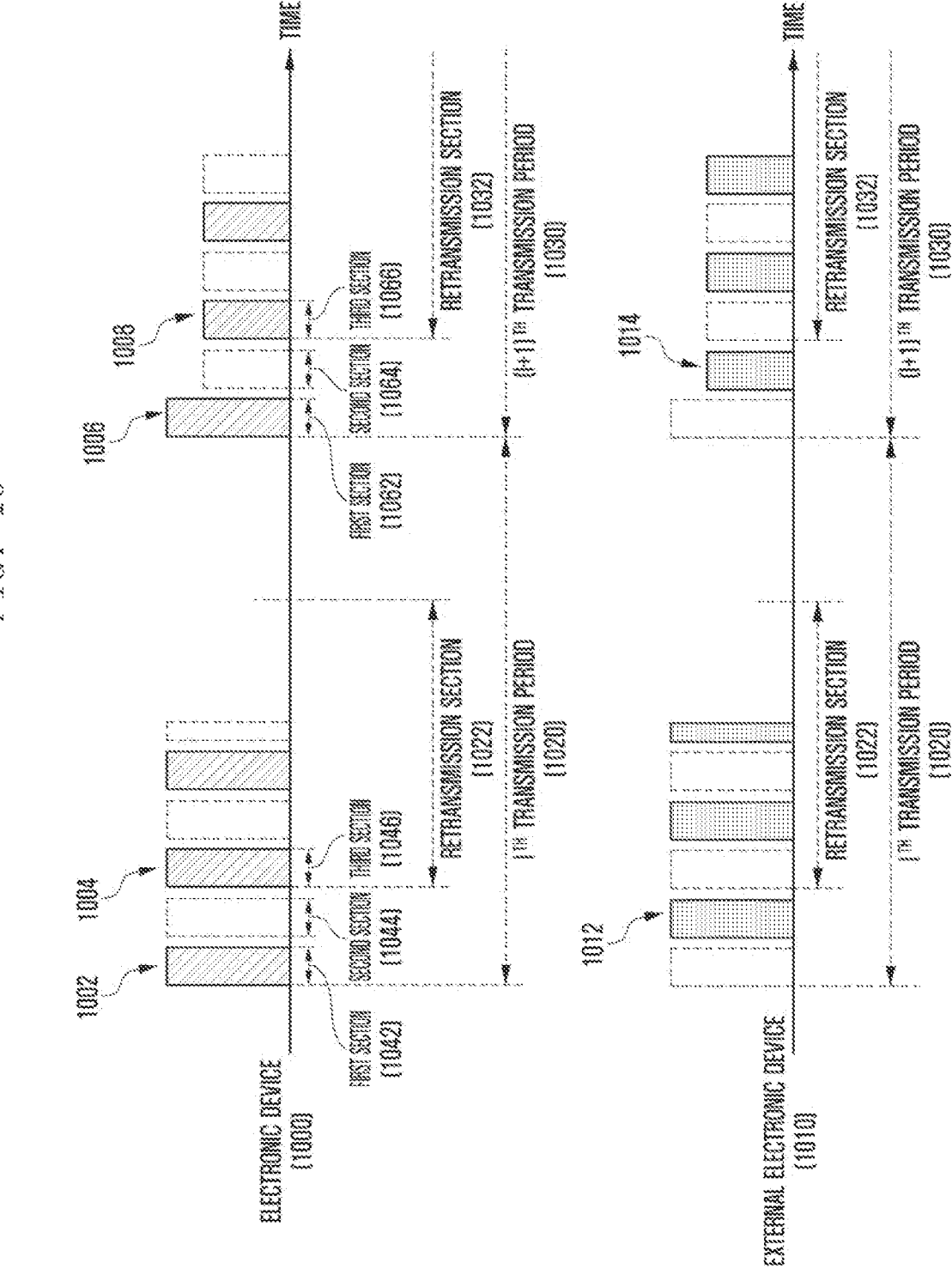
FIG. 10 illustrates another example of changing a packet type, based on status information of wireless communication in an electronic device and an external electronic device according to various embodiments of the disclosure.

FIG. 7 is a flowchart for transmitting voice data, based on status information of wireless communication in an electronic device according to various embodiments of the disclosure. Operations in the following embodiments may be performed sequentially, but are not necessarily performed sequentially. For example, the order of the operations may be changed, or at least two operations may be performed in parallel. For example, the electronic device of FIG. 7 may be the electronic device 101 of FIG. 1 or the first electronic device 200 of FIG. 2. As an example, at least some components of FIG. 7 will be described with reference to FIGS. 9 and 10. FIG. 9 illustrates an example for changing a packet type, based on status information of wireless communication in an electronic device and an external electronic device according to various embodiments of the disclosure. FIG. 10 illustrates another example of changing a packet type, based on status information of wireless communication in an electronic device and an external electronic device according to various embodiments of the disclosure.

Referring to FIG. 7, according to various embodiments, in operation 701, the electronic device (e.g., the processor 120, the wireless communication circuit 192 of FIG. 1, the processor 202 or the wireless communication circuit 204 of FIG. 2) may establish communication with an external electronic device. According to an embodiment, when a signal (e.g., advertising signal) transmitted by the external electronic device is received through the wireless communication circuit 204, the processor 202 may obtain information (e.g., identification information and/or user account information) related to the external electronic device through the received signal. The processor 202 may control the wireless communication circuit 204 to establish a communication link with the external electronic device, based on the information related to the external electronic device.

According to various embodiments, in operation 703, the electronic device (e.g., the processor 120 or 202 or the wireless communication circuit 192 or 204) may configure at least one communication variable related to a voice call through negotiation with the external electronic device. According to an embodiment, the processor 202 may negotiate at least one communication variable for wireless communication (e.g., Bluetooth or BLE) with the external electronic device using a request message (e.g., LMP_eSCO_link request message) including at least one communication variable related to a voice call, thereby generating an extended synchronous connection oriented (eSCO) link.

According to various embodiments, the electronic device (e.g., the processor 120 or 202 or the wireless communication circuit 192 or 204) may identify status information of wireless communication for wireless communication with the external electronic device in operation 705. For example, the status information of wireless communication may include reception sensitivity of a signal received from the external electronic device, a noise level of at least one radio channel usable for wireless communication with the external electronic device, a BER (bit error rate), a PER (packet error rate), a voice data retransmission rate, and/or a channel quality driven data rate (CQDDR). For example, the reception sensitivity may include an average of reception sensitivities detected immediately before transmission of voice data or reception sensitivities detected during a predetermined period of time. For example, the noise level of a radio channel may include a noise level (or an average of noise levels) of at least one radio channel to be used for transmitting voice data to an external electronic device. For example, the voice data retransmission rate may be obtained based on the number of retransmissions of voice data transmitted to an external electronic device for a predetermined period of time. For example, the channel quality driven data rate may be received from the external electronic device, or may be identified during wireless communication with the external electronic device by the electronic device 200. For example, the BER and/or PER may include an average of BER and/or PER detected immediately before transmission of voice data or BER and/or PER detected during a certain period of time.

According to various embodiments, in operation 707, the electronic device (e.g., the processor 120 or 202 or the wireless communication circuit 192 or 204) may identify whether the status information of wireless communication for wireless communication with an external electronic device satisfies a designated first condition. For example, the designated first condition may include reference information for determining whether to change the packet type of the voice data to a second packet type not negotiated with the external electronic device.

According to various embodiments, when the status information of wireless communication satisfies the designated first condition (e.g., 'yes' in operation 707), in operation 709, the electronic device (e.g., the processor 120 or 202 or the wireless communication circuit 192 or 204) may transmit voice data to the external electronic device, based on the second packet type different from the first packet type. According to an embodiment, referring to FIG. 10, when the i$^{th}$ transmission period 1020 arrives, the processor 202 may identify whether the status information of wireless communication for wireless communication with the external electronic device 1010 satisfies the designated first condition. When the status information of the wireless communication satisfies the designated first condition, the processor 202 may determine that the packet type of the voice data is changed to the second packet type (e.g., EV3) not negotiated with the external electronic device 910. Accordingly, the wireless communication circuit 204 may transmit first voice data 1002 of the second packet type to an external electronic device 1010 in a first section 1042. For example, when the processor 202 determines that the packet type of the voice data is changed to the second packet type, the processor 202 may control the wireless communication circuit 204 to transmit the voice data to the external electronic device, based on the second packet type not negotiated with the external electronic device from the next time section within the current transmission period (e.g., i$^{th}$ transmission period 1020), the predefined time section within the current transmission period, or the predefined time section within the next transmission period.

According to various embodiments, when the status information of wireless communication does not satisfy the designated first condition (e.g., 'No' in operation 707), in operation 711, the electronic device (e.g., the processor 120 or 202 or the wireless communication circuit 192 or 204) may transmit the voice data to the external electronic device, based on the first packet type negotiated with the external electronic device. According to an embodiment, referring to FIG. 9, when an i$^{th}$ transmission period 920 arrives, the processor 202 may identify whether the status information of wireless communication for wireless communication with the external electronic device 910 satisfies the designated first condition. When the status information of wireless communication does not satisfy the designated first condition, the processor 202 may control the wireless communication circuit 204 to transmit the first voice data 902 of the first packet type (e.g., 2-EV3) negotiated with the external electronic device 910 to the external electronic device 910 in the first section 942.

According to various embodiments, the second packet type may include at least one packet type other than the first packet type among a plurality of packet types supported by the electronic device 200 and/or the external electronic device. According to an embodiment, the second packet type may be selected based on priorities configured for the plurality of packet types, during negotiation between the electronic device 200 and the external electronic device. According to an embodiment, the second packet type may include a fixed packet type corresponding to the first packet type selected through the negotiation between the electronic device 200 and the external electronic device among the plurality of packet types. According to an embodiment, the second packet type may include at least one packet type selected based on the status information of wireless communication and/or internal resources of the electronic device 200, among the plurality of packet types.

According to various embodiments, referring to FIG. 9, the electronic device 900 may receive information (e.g., NACK or ACK) related to reception of the first voice data 902 and/or second voice data 912 from the external electronic device 910 in a second section 944. According to an embodiment, the external electronic device 910 may decode the first voice data 902 of the first packet type (e.g., 2-EV3) received from the electronic device 900. According to an embodiment, when an error is detected in the first voice data 902, the external electronic device 910 may transmit reception failure information (NACK) related to the first voice data 902 to the electronic device 900 in the second section 944. For example, the external electronic device 910 may transmit the reception failure information (e.g., NACK) of the first voice data 902 to the electronic device 900 in the second section 944, together with the second voice data 912 corresponding to the voice information collected by the external electronic device 910. In this case, the external electronic device 910 may transmit the second voice data 912 of the first packet type (e.g., 2-EV3) to the electronic device 900, based on the status information of wireless communication with the electronic device 900.

According to an embodiment, the electronic device 900 may retransmit third voice data 904 to the external electronic device 910 in a retransmission section 922 (e.g., the third section 946), based on the reception failure information corresponding to the first voice data 902 received from the external electronic device 910 in the second section 944. For example, the electronic device 900 may retransmit the third voice data 904 of the first packet type (e.g., 2-EV3) to the external electronic device 910 in the third section 946, based on the status information of wireless communication with the external electronic device 910. As an example, the electronic device 900 may transmit information (e.g., NACK) related to reception of the second voice data 912 to the external electronic device 910 in the third section 946, together with the third voice data 904. For example, the third voice data 904 may include the same voice information (e.g., the k$^{th}$ packet and the (k−1)$^{th}$ packet) as the first voice data 902 or different voice information (e.g., the k$^{th}$ packet).

According to an embodiment, the electronic device 900 may receive the information (e.g., NACK or ACK) related to reception of the third voice data 904 and/or fourth voice data 914 from the external electronic device 910 in a fourth section 948. For example, when an error is detected in the third voice data 904 received from the electronic device 900 in the third section 946, the external electronic device 910 may transmit reception failure information (NACK) related to the third voice data 904 to the electronic device 900 in the fourth section 948. For example, the external electronic device 910 may transmit reception failure information (e.g., NACK) of the third voice data 904 to the electronic device 900, together with the fourth voice data 914 in the fourth section 948. In this case, the external electronic device 910 may retransmit the fourth voice data 914 of the first packet type (e.g., 2-EV3) to the electronic device 900, based on the status information of wireless communication with the electronic device 900.

According to an embodiment, the electronic device 900 may retransmit fifth voice data 906 to the external electronic device 910 in a fifth section 950, based on the reception failure information corresponding to the third voice data 904 received from the external electronic device 910 in the fourth section 948. For example, the electronic device 900 may retransmit the fifth voice data 906 of the second packet type (e.g., EV3) to the external electronic device 910, based on the status information of wireless communication with the external electronic device 910. For example, the fifth voice data 906 may include the same voice information (e.g., the $k^{th}$ packet) as the third voice data 904 or different voice information (e.g., the $k^{th}$ packet and the $(k-1)^{th}$ packet).

Figure 8:
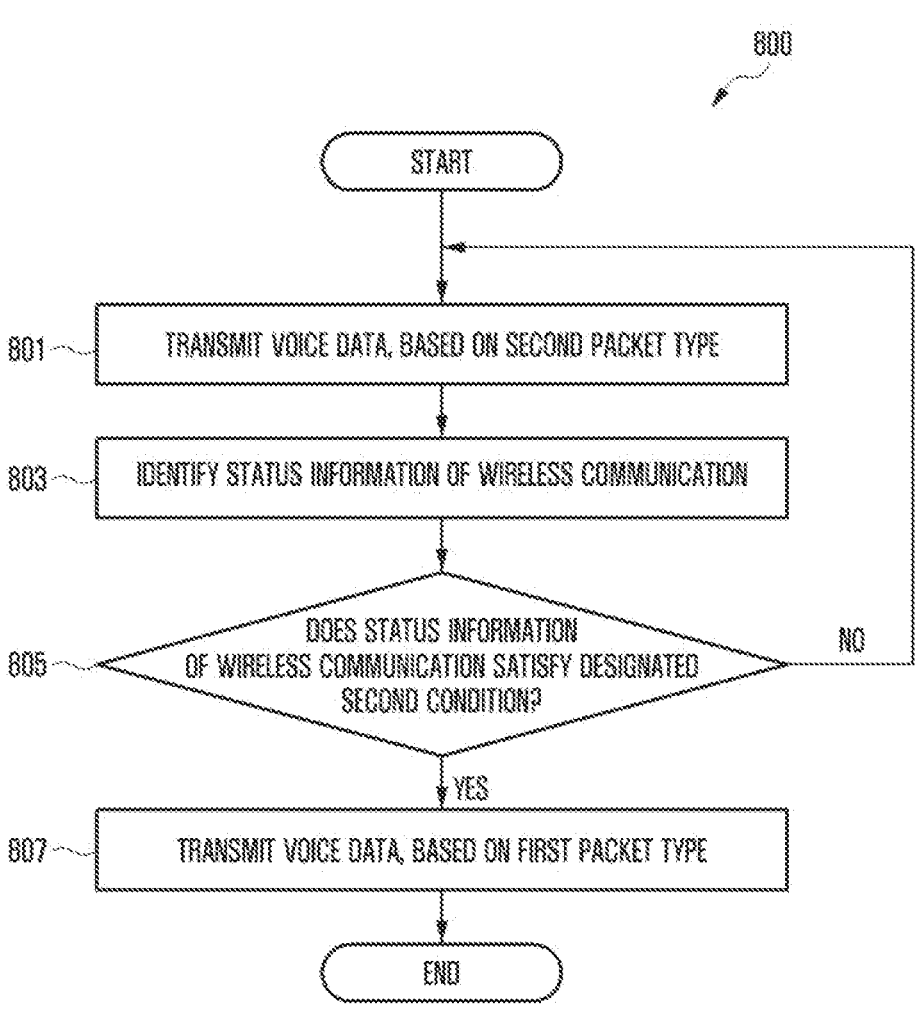
FIG. 8 is a flowchart for configuring a packet type of voice data, based on status information of wireless communication in an electronic device according to various embodiments of the disclosure.

FIG. 8 is a flowchart for configuring a packet type of voice data, based on status information of wireless communication in an electronic device according to various embodiments of the disclosure. According to an embodiment, the operations of FIG. 8 may be additional operations of the operation 709 of FIG. 7. The operations in the following embodiments may be performed sequentially, but are not necessarily performed sequentially. For example, the order of the operations may be changed, or at least two operations may be performed in parallel. For example, the electronic device of FIG. 8 may be the electronic device 101 of FIG. 1 or the first electronic device 200 of FIG. 2. As an example, at least some components of FIG. 8 will be described with reference to FIGS. 9 and 10.

Referring to FIG. 8, according to various embodiments, when status information of wireless communication for wireless communication with the external electronic device satisfies a designated first condition (e.g., 'Yes' in operation 707 of FIG. 7), in operation 801, the electronic device (e.g., the processor 120, wireless communication circuit 192 of FIG. 1, the processor 202 or the wireless communication circuit 204 of FIG. 2) may transmit (or retransmit) voice data to the external electronic device, based on a second packet type that is different from the first packet type negotiated with the external electronic device. According to an embodiment, as shown in FIG. 9, the processor 202 may control the wireless communication circuit 204 to retransmit the fifth voice data 906 of the second packet type (e.g., EV3) different from the first packet type negotiated with the external electronic device 910 to the external electronic device 910, based on the status information of wireless communication with the external electronic device 910 in a fifth section 950. According to an embodiment, as shown in FIG. 10, the processor 202 may control the wireless communication circuit 204 to transmit first voice data 1002 of the second packet type (e.g., EV3) different from the first packet type to the external electronic device 1010, based on the status information of wireless communication with the external electronic device 1010 in a first section 1042.

According to various embodiments, in operation 803, the electronic device (e.g., the processor 120 or 202 or the wireless communication circuit 192 or 204) may identify status information for wireless communication with the external electronic device. For example, the status information for wireless communication (or status information of wireless communication) may include reception sensitivity of a signal received from an external electronic device, a noise level of at least one radio channel available for wireless communication with an external electronic device, a bit error rate (BER), a packet error rate (PER), a voice data retransmission rate, and/or a channel quality driven data rate (CQDDR).

According to various embodiments, in operation 805, the electronic device (e.g., the processor 120 or 202 or the wireless communication circuit 192 or 204) may identify whether the status information for wireless communication with the external electronic device satisfies a designated second condition. For example, the designated second condition may include reference information for determining whether to change the packet type of voice data configured to the second packet type not negotiated with the external electronic device to the first packet type negotiated with the external electronic device. For example, the designated second condition may be different from or the same as the designated first condition of FIG. 7.

According to various embodiments, when the status information of wireless communication does not satisfy the second designated condition (e.g., 'No' in operation 805), in operation 801, the electronic device (e.g., the processor 120 or 202 or the wireless communication circuit 192 or 204) may transmit voice data to the external electronic device, based on the second packet type not negotiated with the external electronic device. According to an embodiment, referring to FIG. 9, when reception failure information (NACK) corresponding to the fifth voice data 906 is received from the external electronic device 910 in a sixth section 952, the processor 202 may control the wireless communication circuit 204 to retransmit seventh voice data 908 of the second packet type (e.g., EV3) different from the first packet type to the external electronic device 910, based on the status information of wireless communication with the external electronic device 910 in the seventh section 954. For example, reception failure information (NACK) corresponding to the fifth voice data 906 may be received in the sixth section 952, along with the sixth voice data 916 of the first packet type (e.g., 2-EV3). According to an embodiment, referring to FIG. 10, when the reception failure information (NACK) corresponding to the first voice data 1002 is received from the external electronic device 1010 in the second section 1044, the processor 202 may control the wireless communication circuit 204 to retransmit third voice data 1004 of the second packet type (e.g., EV3) to the external electronic device 1010, based on the status information of wireless communication with the external electronic device 1010 in the third section 1046. For example, the reception failure information (NACK) corresponding to the first voice data 1002 may be received in the second section 1044, along with the second voice data 1012 of the second packet type. According to an embodiment, referring to FIG. 10, when a $(i+1)^{th}$ transmission period 1030 arrives, the processor 202 may control the wireless communication circuit 204 to transmit fourth voice data 1006 of the second packet type (e.g., EV3) different from the first packet type to the external electronic device 1010, based on the status information of wireless communication with the external electronic device 1010 in a first section 1062 of the $(i+1)^{th}$ transmission period 1030.

According to various embodiments, when the status information of wireless communication satisfies the designated second condition (e.g., 'Yes' in operation 805), in operation 807, the electronic device (e.g., the processor 120 or 202 or the wireless communication circuit 192 or 204) may transmit the voice data to the external electronic device, based on the first packet type. According to an embodiment, referring to FIG. 9, when the $(i+1)^{th}$ transmission period 930 arrives, the processor 202 may control the wireless communication circuit 204 to transmit eighth voice data 909 of the first packet type (e.g., 2-EV3) to the external electronic device 910, based on the status information of wireless communication with the external electronic device 910 in a first section 962 of the $(i+1)^{th}$ transmission period 930. According to an embodiment, referring to FIG. 10, when reception failure information (NACK) corresponding to the fourth voice data 1006 is received from the external electronic device 1010 in a second section 1064 of the $(i+1)^{th}$ transmission period 1030, the processor 202 may control the wireless communication circuit 204 to retransmit sixth voice data 1008 of the first packet type (e.g., 2-EV3) negotiated with the external electronic device 1010 to the external electronic device 1010, based on the status information of wireless communication with the external electronic device 1010 in a third section 1066 of the $(i+1)^{th}$ transmission period 1030. For example, the reception failure information (NACK) corresponding to the fourth voice data 1006 may be received in the second section 1064, together with the fifth voice data 1014 of the first packet type.

According to an embodiment, when it is determined that the packet type of voice data is changed to the first packet type negotiated with the external electronic device, the processor 202 may control the wireless communication circuit 204 to transmit voice data to the external electronic device, based on the first packet type negotiated with the external electronic device from the next time interval within the current transmission period, the predefined time interval within the current transmission period, or the predefined time interval within the next transmission period.

Figure 11:
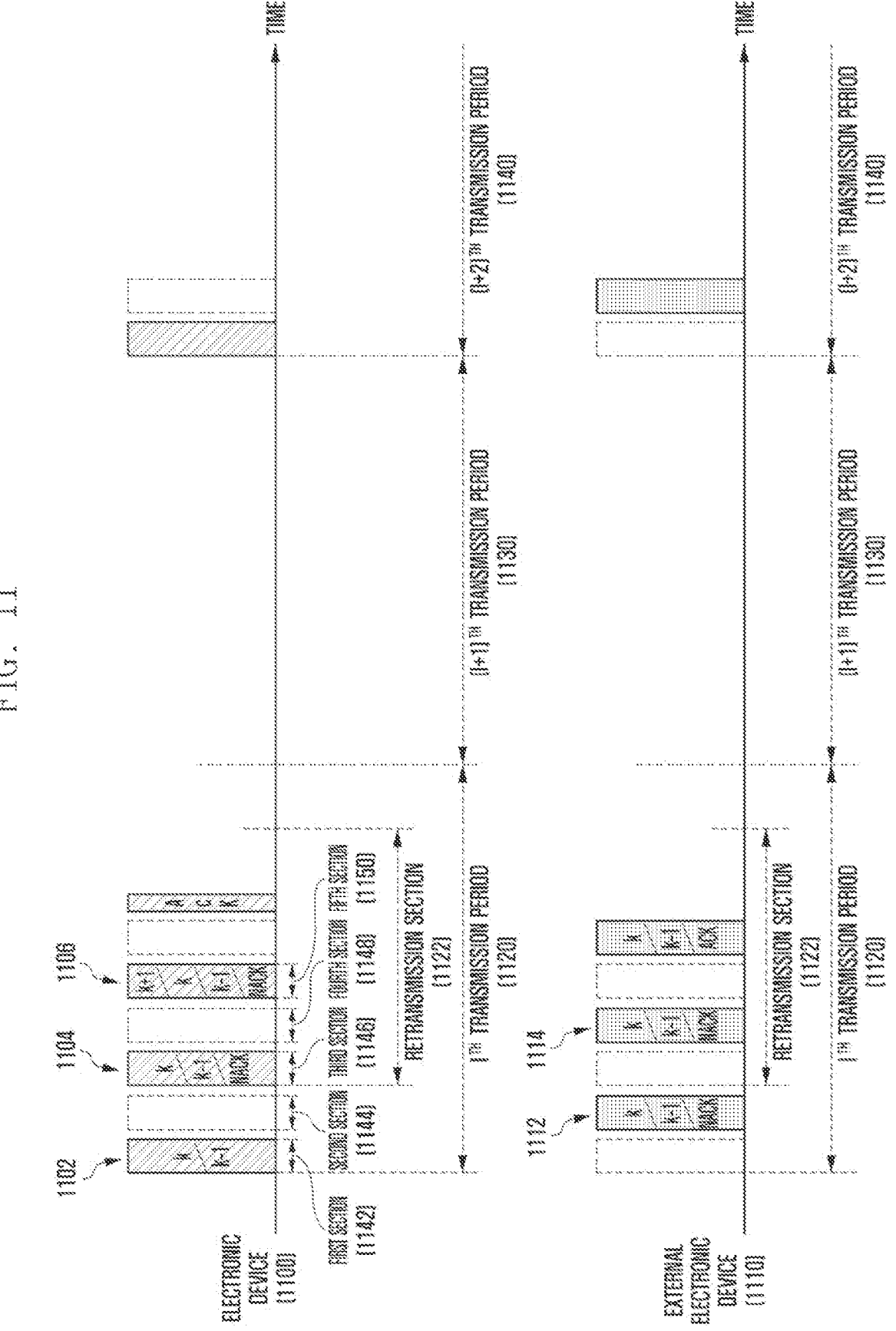
FIG. 11 illustrates further another example of changing a packet type, based on status information of wireless communication in an electronic device and an external electronic device according to various embodiments of the disclosure.

According to various embodiments, as shown in FIG. 11, the electronic device (e.g., the processor 120 or 202 or the wireless communication circuit 192 or 204) may change the transmission period of voice data by changing the packet type of the voice data.

FIG. 11 illustrates another example of changing a packet type, based on status information of wireless communication in an electronic device and an external electronic device according to various embodiments of the disclosure.

According to various embodiments, when an $i^{th}$ transmission period 1120 arrives, the electronic device 1100 may identify whether status information of wireless communication for wireless communication with an external electronic device 1110 satisfies a designated first condition. When the status information of wireless communication does not satisfy the designated first condition, the electronic device 1100 may transmit first voice data 1102 of a first packet type (e.g., 2-EV3) negotiated with the external electronic device 1110 to the external electronic device 1110 in a first section 1142. For example, the first voice data 1102 may include a $k^{th}$ packet and a $(k-1)^{th}$ packet, based on the first packet type (e.g., 2-EV3).

According to an embodiment, the electronic device 1100 may receive information (e.g., NACK or ACK) related to reception of the first voice data 1102 and/or second voice data 1112 from the external electronic device 1110 in a second section 1144. According to an embodiment, the external electronic device 1110 may transmit information (e.g., NACK) related to reception of the first voice data 1102, together with the second voice data 1112 corresponding to the voice information collected by the external electronic device 1110 to the electronic device 1100 in the second section 1144. In this case, the external electronic device 1110 may transmit the second voice data 1112 of the first packet type (e.g., 2-EV3) to the electronic device 1100, based on the status information of wireless communication with the electronic device 1100.

According to an embodiment, when the electronic device 1100 receives reception failure information corresponding to the first voice data 1102 from the external electronic device 1110 in the second section 1144, the electronic device 1100 may retransmit third voice data 1104 to the external electronic device 1110 in a retransmission section 1122 (e.g., the third section 1146). For example, the electronic device 1100 may retransmit third voice data 1104 of the first packet type (e.g., 2-EV3) to the external electronic device 1110, based on the status information of wireless communication with the external electronic device 1110. For example, the first voice data 1104 may include a $k^{th}$ packet and a $(k-1)^{th}$ packet, based on the first packet type (e.g., 2-EV3). For example, the electronic device 1100 may transmit information (e.g., NACK) related to reception of the second voice data 1112, together with the third voice data 1104 to the external electronic device 1110.

According to an embodiment, the electronic device 1100 may receive information (e.g., NACK or ACK) related to reception of the third voice data 1104 and/or fourth voice data 1114 from the external electronic device 1110 in a fourth section 1148. According to an embodiment, when the external electronic device 1110 receives the reception failure information corresponding to the second voice data 1112 from the electronic device 1100 in the third section 1146, the external electronic device 1110 may transmit information (e.g., NACK) related to reception of the third voice data 1104, together with the fourth voice data 1114 to the electronic device 1100 in the fourth section 1148. In this case, the external electronic device 1110 may retransmit the fourth voice data 1114 of the first packet type (e.g., 2-EV3) to the electronic device 1100, based on the status information of wireless communication with the electronic device 1100.

According to an embodiment, when the electronic device 1100 receives the reception failure information corresponding to the third voice data 1104 from the external electronic device 1110 in the fourth section 1148, the electronic device 1100 may retransmit the fifth voice data 1106 to the external electronic device 1110 in a fifth section 1150. For example, the electronic device 1100 may retransmit the fifth voice data 1106 of a third packet type (e.g., 3-EV3) different from the first packet type, based on the status information of wireless communication with the external electronic device 1110. For example, the fifth voice data 1106 may include a $(k-1)^{th}$ packet, a $k^{th}$ packet, and a $(k+1)^{th}$ packet, based on the third packet type (e.g., 3-EV3).

According to an embodiment, when reception success information (ACK) corresponding to the fifth voice data 1106 is received, the electronic device 1100 may determine that transmission of the $(k-1)^{th}$ packet, the $k^{th}$ packet, and the $(k+1)^{th}$ packet included in the fifth voice data 1106 has succeeded. In this case, the electronic device 1100 may omit the $(i+1)^{th}$ transmission period 1130 or may widen the $i^{th}$ transmission period 1120 to include the $(i+1)^{th}$ transmission period 1130. Accordingly, the transmission period of the voice data between the electronic device 1100 and the external electronic device 1110 may be changed based on a change in the packet type.

According to various embodiments, the electronic device 200 and/or the external electronic device may determine whether to change the packet type, based on the status information wireless communication and/or information related to internal resources. For example, the internal resources of the electronic device may include power, time, and/or frequency usable for wireless communication (e.g., Bluetooth or BLE) between the electronic device 200 and the external electronic device. For example, the internal resources of the electronic device may be configured based on whether wireless communication is additionally performed with another electronic device through Bluetooth or BLE.

Figure 12:
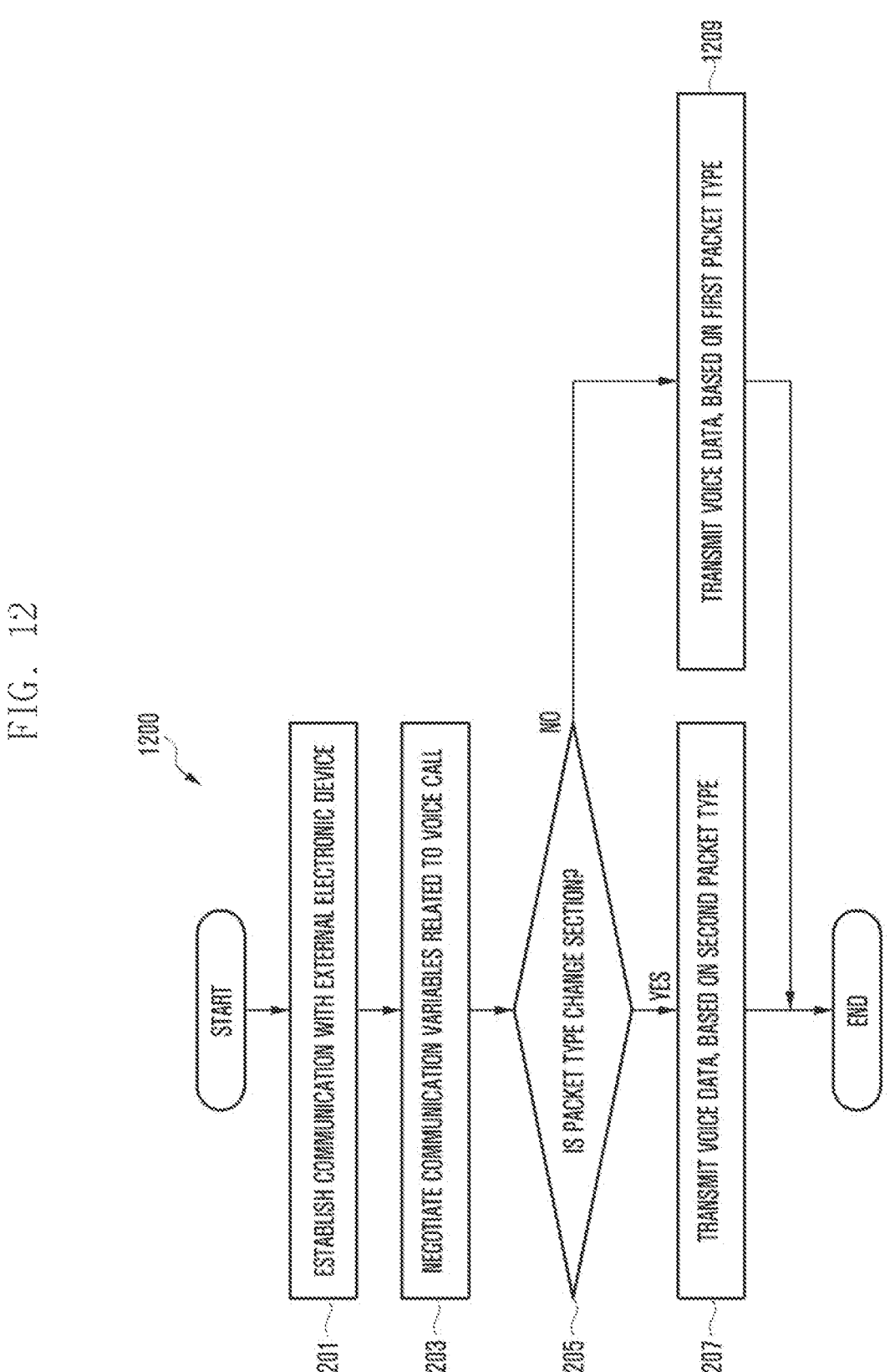
FIG. 12 is a flowchart for changing a packet type at a fixed location in an electronic device according to various embodiments of the disclosure.
Figure 13:
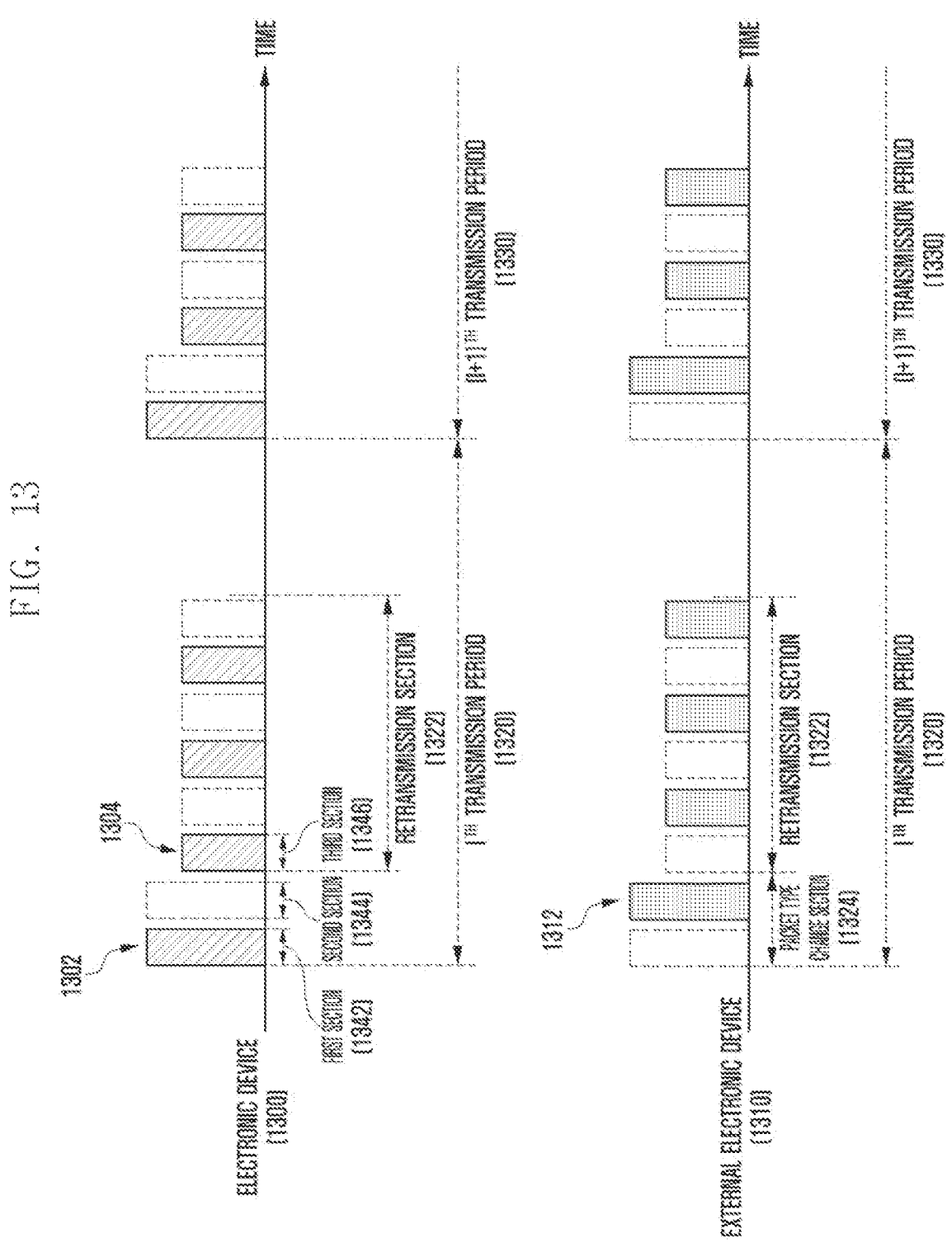
FIG. 13 illustrates another example of changing a packet type at a fixed location in an electronic device and an external electronic device according to various embodiments of the disclosure.
Figure 14:
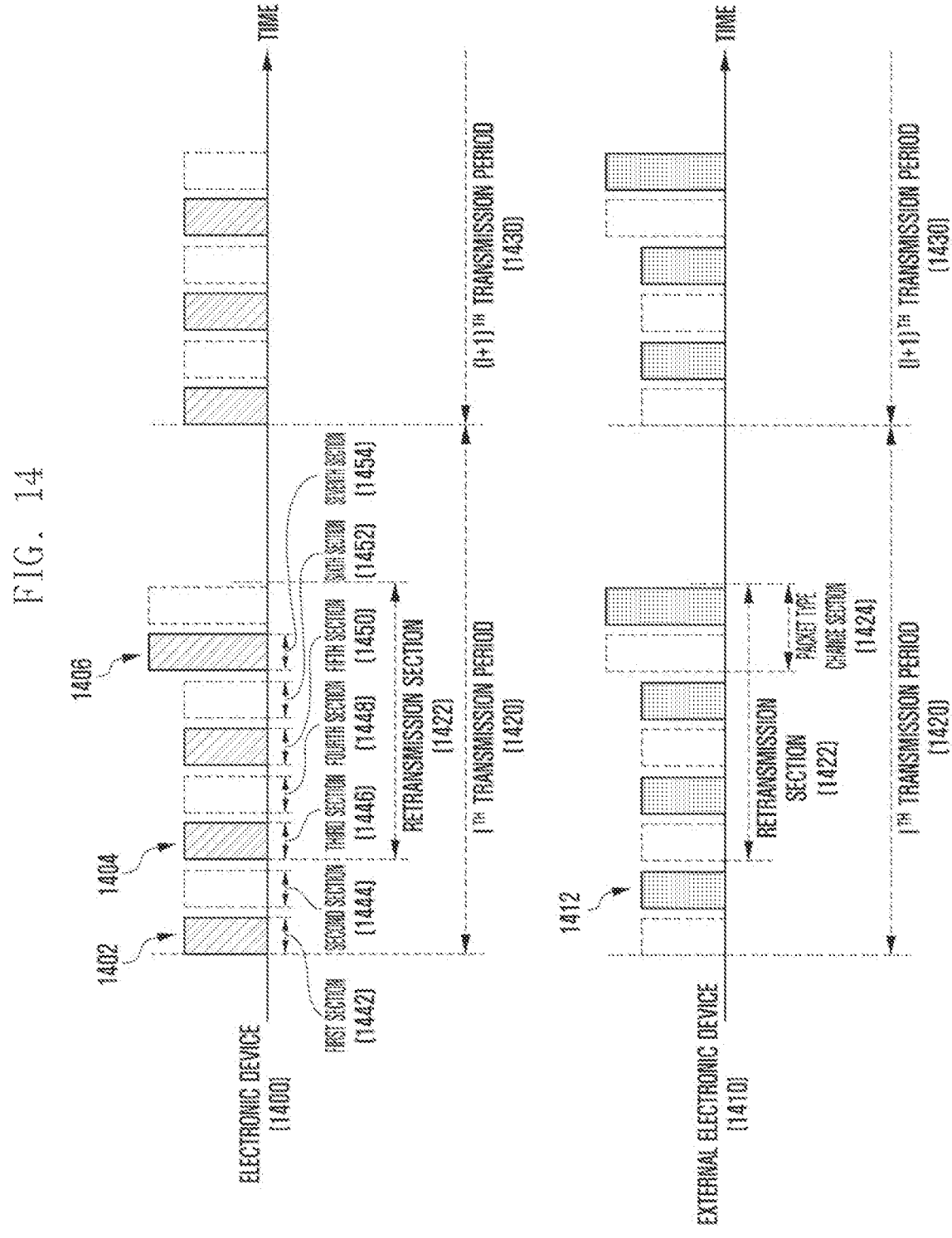
FIG. 14 illustrates further another example of changing a packet type at a fixed location in an electronic device and an external electronic device according to various embodiments of the disclosure.

FIG. 12 is a flowchart for changing a packet type at a fixed location in an electronic device according to various embodiments of the disclosure. Operations in the following embodiments may be performed sequentially, but are not necessarily performed sequentially. For example, the order of the operations may be changed, or at least two operations may be performed in parallel. As an example, the electronic device of FIG. 12 may be the electronic device 101 of FIG. 1 or the first electronic device 200 of FIG. 2. As an example, at least some components of FIG. 12 will be described with reference to FIGS. 13 and 14. FIG. 13 illustrates another example of changing a packet type at a fixed location in an electronic device and an external electronic device according to various embodiments of the disclosure. FIG. 14 illustrates another example of changing a packet type at a fixed location in an electronic device and an external electronic device according to various embodiments of the disclosure.

Referring to FIG. 12, according to various embodiments, the electronic device (e.g., the processor 120, the wireless communication circuit 192 of FIG. 1, the processor 202 or the wireless communication circuit 204 of FIG. 2) may establish communication with an external electronic device in operation 1201. According to an embodiment, when the processor 202 receives a signal (e.g., an advertising signal) transmitted by the external electronic device through the wireless communication circuit 204, the processor 202 may recognize that the external electronic device is adjacent. The processor 202 may control the wireless communication circuit 204 to establish a communication link with the external electronic device, based on information (e.g., identification information and/or user account information) related to the external electronic device obtained through the received signal.

According to various embodiments, the electronic device (e.g., the processor 120 or 202 or the wireless communication circuit 192 or 204) may configure at least one communication variable related to transmission and/or reception of voice data through negotiation with the external electronic device, in operation 1203. For example, the at least one communication variable may include at least one of packet type, packet length, transmission section (or transmission period) of voice data (e.g., $T_{eSCO}$), retransmission section (e.g., $W_{eSCO}$), or information related to synchronization configurations (e.g., $D_{eSCO}$).

According to various embodiments, the electronic device (e.g., the processor 120 or 202 or the wireless communication circuit 192 or 204) may determine whether a packet type change section arrives, in operation 1205. For example, the packet type change section may include a predefined time interval configured to change the packet type.

According to various embodiments, when the packet type change interval arrives (e.g., 'Yes' in operation 1205), in operation 1207, the electronic device (e.g., the processor 120 or 202 or the wireless communication circuit 192 or 204) may transmit voice data to the external electronic device, based on a second packet type that is different from a first packet type negotiated with the external electronic device. According to an embodiment, referring to FIG. 13, when a first section 1342 of an i$^{th}$ transmission period 1320 is configured as a packet type change section 1324, the processor 202 may determine that the packet type of the voice data is changed to a second packet type (e.g., EV3) different from the first packet type negotiated with the external electronic device 1310. Accordingly, the wireless communication circuit 204 may transmit first voice data 1302 of the second packet type to the external electronic device 1310.

According to various embodiments, when the packet type change section does not arrive (e.g., 'No' in operation 1205), in operation 1209, the electronic device (e.g., the processor 120 or 202 or the wireless communication circuit 192 or 204) may transmit voice data to the external electronic device, based on the first packet type negotiated with the external electronic device. According to an embodiment, the external electronic device 1310 may decode the first voice data 1302 of the second packet type (e.g., EV3) received from the electronic device 1300. For example, when an error is detected in the first voice data 1302, the external electronic device 1310 may transmit reception failure information (NACK) related to the first voice data 1302 to the electronic device 1300 in the second section 1344, along with second voice data 1312 corresponding to the voice information collected by the external electronic device 1310. For example, since the second voice data 1312 is transmitted in the second section 1344 configured as the packet type change section 1324, the second voice data 1312 may be configured as the second packet type (e.g., EV3). Accordingly, the electronic device 1300 may receive the information (e.g., NACK or ACK) related to reception of the first voice data 1302 and/or second voice data 1312 from the external electronic device 1310 in the second section 1344.

According to an embodiment, the electronic device 1300 may retransmit third voice data 1304 to the external electronic device 1310, based on the reception failure information corresponding to the first voice data 1302 in a third section 1346 of the retransmission section 1322. For example, the electronic device 1300 may retransmit the third voice data 1304 of the first packet type (e.g., 2-EV3) negotiated with the external electronic device 1310 to the external electronic device 1310 during the remaining section (e.g., the third section 1346) other than the packet type change section 1324 during the i$^{th}$ transmission period 1320. For example, the electronic device 1300 may transmit information (e.g., NACK) related to reception of the second voice data 1312, together with the third voice data 1304 to the external electronic device 1310.

According to various embodiments, referring to FIG. 14, when an i$^{th}$ transmission period 1420 arrives, the electronic device 1400 may transmit first voice data 1402 of the first packet type (e.g., 2-EV3) negotiated with the external electronic device 1410 to the external electronic device 1410 in a first section 1442. In this case, the first voice data 1402 may be configured in a first packet type (e.g., 2-EV3) negotiated with the external electronic device 1410 because the first section 1442 is not configured as the packet type change section 1424.

According to an embodiment, the electronic device 1400 may receive information (e.g., NACK or ACK) related to reception of the first voice data 1402 and/or second voice data 1412 from the external electronic device 1410 in a second section 1444. According to an embodiment, the external electronic device 1410 may decode the first voice data 1402 received from the electronic device 1400. For example, when an error is detected in the first voice data 1402, the external electronic device 1410 may transmit reception failure information (NACK) related to the first voice data 1402 to the electronic device 1400 in the second section 1444, along with the second voice data 1412 corresponding to the voice information collected by the external electronic device 1410. For example, because the second voice data 1412 is transmitted in the remaining sections other than the packet type change section 1424 (e.g., the second interval 1444), the second voice data 1412 may be configured in the first packet type (e.g., 2-EV3).

According to an embodiment, the electronic device 1400 may retransmit third voice data 1404 to the external electronic device 1410 in a retransmission section 1422, based on the reception failure information corresponding to the first voice data 1402 received from the external electronic device 1410 in the second section 1444. For example, the electronic device 1400 may retransmit the third voice data 1404 of the first packet type (e.g., 2-EV3) negotiated with the external electronic device 1410 to the external electronic device 1410 during the remaining sections (e.g., the third section 1446) other than the packet type change period 1424 during the retransmission section 1422. For another example, the electronic device 1400 may retransmit fifth voice data 1406 of the second packet type (e.g., EV3) not negotiated with the external electronic device 1410 to the external electronic device 1410 in a section configured as the packet type change section 1424 (e.g., a seventh section 1454) during the retransmission section 1422. For example, the third voice data 1404 may include the same voice information (e.g., the $k^{th}$ packet and the $(k-1)^{th}$ packet) as the first voice data 1402 or different voice information (e.g., the $k^{th}$ packet). For example, the fifth voice data 1406 may include the same voice information (e.g., the $k^{th}$ packet) as the third voice data 1404 or different voice information (e.g., the $k^{th}$ packet and the $(k-1)^{th}$ packet).

According to various embodiments, the electronic device 200 may change the packet type of the voice data for transmitting and/or receiving through at least one time section among a plurality of time sections included in a transmission period of the voice data to a second packet type not negotiated with the external electronic device. According to an embodiment, as shown in FIG. 12, the electronic device 200 may change the packet type of the voice data to the second packet type not negotiated with the external electronic device in at least one predefined time section (e.g., packet type change section) among a plurality of time sections included in the transmission period of the voice data. According to an embodiment, the electronic device 200 may change the packet type of the voice data to the second packet type not negotiated with the external electronic device, based on status information of wireless communication and/or internal resources of the electronic device 200 in at least one other time section other than at least one time section configured as the packet type change section among a plurality of time sections included in the transmission period of the voice data.

Figure 15:
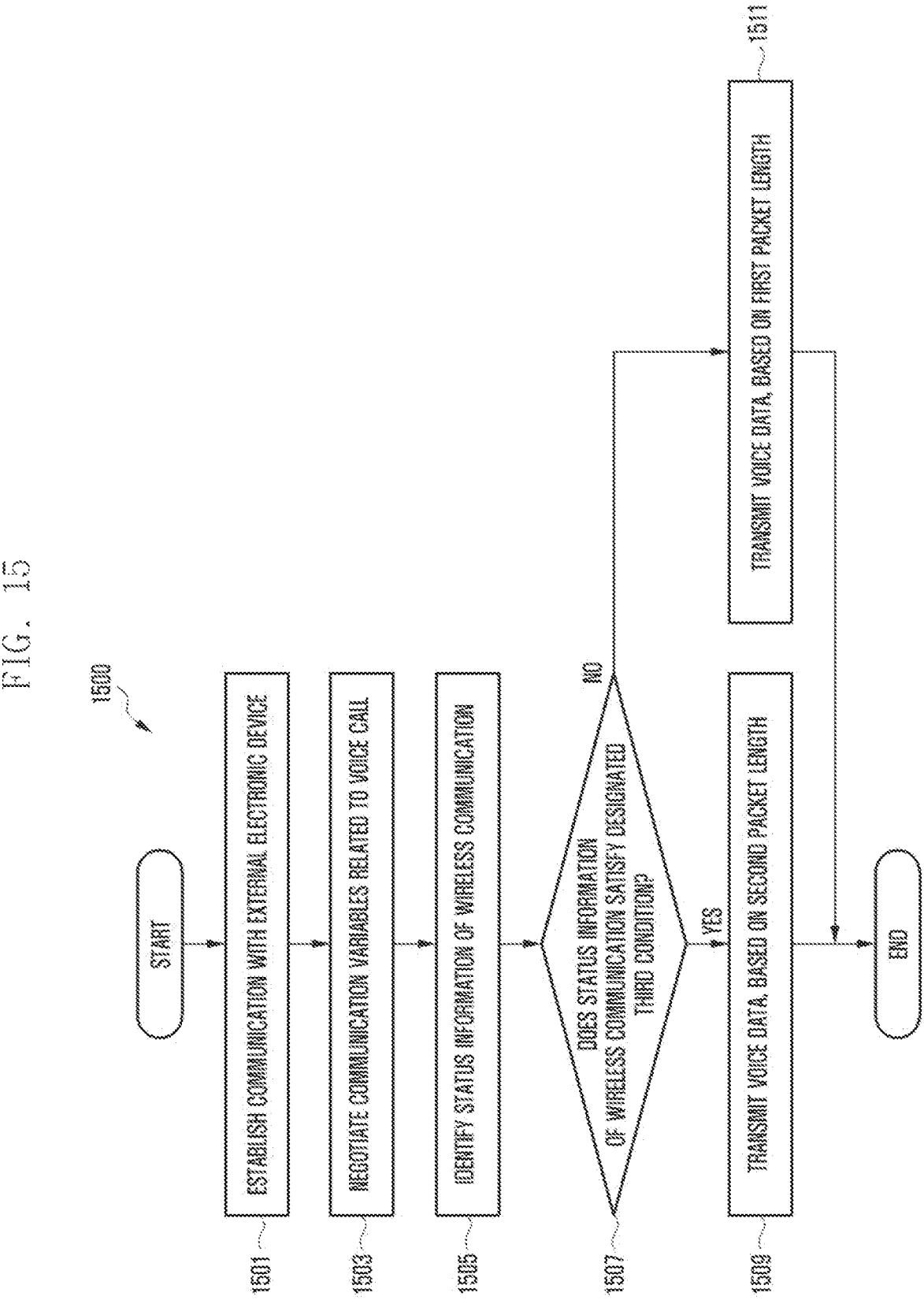
FIG. 15 is a flowchart for configuring a length of a packet, based on status information of wireless communication in an electronic device according to various embodiments of the disclosure.

FIG. 15 is a flowchart for configuring the length of a packet, based on status information of wireless communication in an electronic device according to various embodiments of the disclosure. Operations in the following embodiments may be performed sequentially, but are not necessarily performed sequentially. For example, the order of the operations may be changed, or at least two operations may be performed in parallel. For example, the electronic device of FIG. 15 may be the electronic device 101 of FIG. 1 or the first electronic device 200 of FIG. 2.

Referring to FIG. 15, according to various embodiments, the electronic device (e.g., the processor 120, the wireless communication circuit 192 of FIG. 1, the processor 202 or the wireless communication circuit 204 of FIG. 2) may establish communication with an external electronic device, in operation 1501. According to an embodiment, when receiving a signal (e.g., an advertising signal) generated by the external electronic device through a wireless communication circuit 204, the processor 202 may recognize the external electronic device adjacent to the electronic device 200. When a user of the electronic device 200 accepts a communication connection with the external electronic device, the processor 202 may control the wireless communication circuit 204 to establish a communication link with the external electronic device, based on information (e.g., identification information and/or user account information) related to the external electronic device obtained through the received signal.

According to various embodiments, in operation 1503, the electronic device (e.g., processor 120 or 202 or wireless communication circuit 192 or 204) may configure at least one communication variable to be used for transmitting and/or receiving voice data with the external electronic device through negotiation with the external electronic device. For example, the at least one communication variable may include at least one of a packet type, a packet length, a transmission section (or transmission period) (e.g., $T_{eSCO}$) of voice data, retransmission section (e.g., $W_{eSCO}$), or information (e.g., $D_{eSCO}$) related to synchronization configurations.

According to various embodiments, the electronic device (e.g., the processor 120 or 202 or the wireless communication circuit 192 or 204) may identify status information of wireless communication for wireless communication with the external electronic device, in operation 1505. For example, the status information of wireless communication may include reception sensitivity of a signal received from the external electronic device, a noise level of at least one radio channel usable for the wireless communication with the external electronic device, a bit error rate (BER), a packet error rate (PER), a voice data retransmission rate, and/or a channel quality driven data rate (CQDDR).

According to various embodiments, in operation 1507, the electronic device (e.g., the processor 120 or 202 or the wireless communication circuit 192 or 204) may identify whether the status information of wireless communication for wireless communication with the external electronic device satisfies a designated third condition. For example, the designated third condition may include reference information for determining whether to change the packet length of voice data to a second packet length not negotiated with the external electronic device.

According to various embodiments, when the status information of wireless communication satisfies the designated third condition (e.g., 'Yes' in operation 1507), in operation 1509, the electronic device (e.g., the processor 120 or 202 or the wireless communication circuit 192 or 204) may transmit voice data to the external electronic device, based on a second packet length that is different from the first packet length negotiated with the external electronic device. According to an embodiment, the processor 202 may change the packet length of the voice data by changing the packet type or changing the amount of data to be transmitted to the external electronic device through the voice data. For example, when changing the first packet type (e.g., 2-EV3) to a third packet type (e.g., 3-EV3) not negotiated with the external electronic device while maintaining a data size (e.g., 60 bytes) included in the voice data of the first packet length, the processor 202 may change the packet length of the voice data to a second packet length. For another example, the processor 202 may reduce the data size (e.g., 60 bytes) included in the voice data having the first packet length, so that the packet length of the voice data may be changed to the second packet length even if the first packet type (e.g., 2-EV3) is used.

According to various embodiments, when the status information of wireless communication does not satisfy the designated third condition (e.g., 'No' in operation 1507), in operation 1511, the electronic device (e.g., the processor 120 or 202 or the wireless communication circuit 192 or 204) may transmit voice data to the external electronic device, based on the first packet length negotiated with the external electronic device. According to an embodiment, the processor 202 may configure voice data having the packet type and packet length negotiated with the external electronic device and transmit the configured voice data to the external electronic device.

According to various embodiments, when the electronic device (e.g., the processor 120 or 202 or the wireless communication circuit 192 or 204) changes the packet length of voice data to the second packet length, the electronic device may transmit voice data having the second packet length to the external electronic device until the status information of wireless communication satisfies a designated fourth condition. For example, when the status information of wireless communication satisfies the designated fourth condition, the electronic device (e.g., the processor 120 or 202 or the wireless communication circuit 192 or 204) may change the packet length of the voice data transmitted to the external electronic device to the first packet length negotiated with the external electronic device.

According to various embodiments, the electronic device 200 and/or the external electronic device may determine whether the packet length is changed, based on the status information of wireless communication and/or information related to internal resources.

Figure 16:
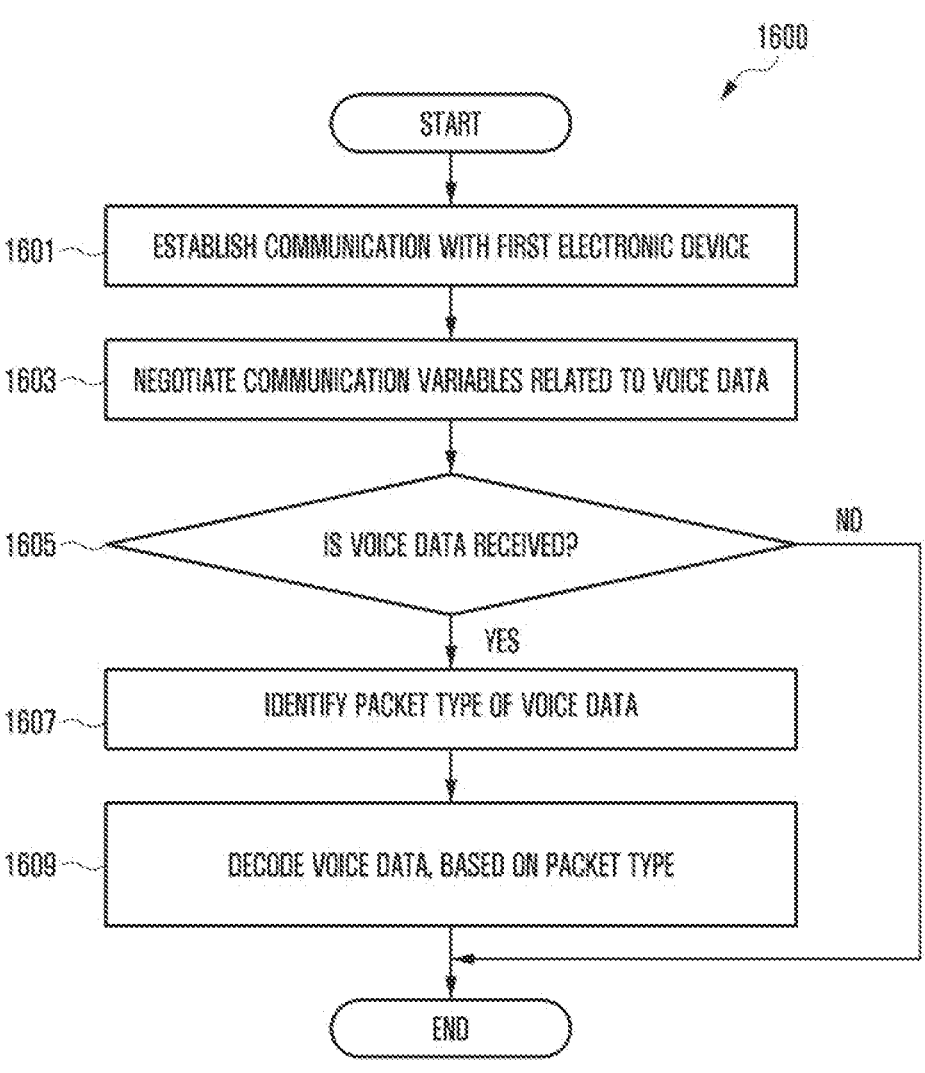
FIG. 16 is a flowchart for receiving voice data in an external electronic device according to various embodiments of the disclosure.

FIG. 16 is a flowchart for receiving voice data in an external electronic device according to various embodiments of the disclosure. Operations in the following embodiments may be performed sequentially, but are not necessarily performed sequentially. For example, the order of the operations may be changed, or at least two operations may be performed in parallel. As an example, the electronic device of FIG. 16 may be the electronic device 101 of FIG. 1.

Referring to FIG. 16, according to various embodiments, the external electronic device (e.g., the processor 120 or the wireless communication circuit 192 of FIG. 1) may establish communication with an electronic device 200, in operation 1601. According to an embodiment, the external electronic device may transmit a signal for communication connection with the electronic device 200 in a multicast method or a broadcast method. For example, the external electronic device may periodically transmit the signal for communication connection with the electronic device 200 in an active state. For another example, when the external electronic device is switched to a connection mode (e.g., pairing mode), based on a user input, the external electronic device may transmit the signal for communication connection with the electronic device 200. For example, the signal for communication connection with the electronic device 200 may include at least one of external electronic device identification information, user account information, pairing information, pairing list, detection area, multi-pairing information, battery status information, or transmission power. According to an embodiment, when receiving a response signal related to the signal for communication connection with the electronic device 200, the external electronic device may establish a communication link with the electronic device that transmits the response signal.

According to various embodiments, in operation 1603, the external electronic device (e.g., the processor 120 or the wireless communication circuit 192) may negotiate at least one communication variable related to a voice call with the electronic device 200. According to an embodiment, the external electronic device may receive a request signal (e.g., a link manager (LM) message) including at least one communication variable related to transmission and/or reception of voice data configured by the electronic device 200. For example, when accepting the at least one communication variable included in the request signal, the external electronic device may transmit an acceptance signal corresponding to the request signal to the electronic device 200. In this case, the at least one communication variable related to the voice call with the electronic device 200 may be configured to at least one communication variable included in the request signal. For example, the at least one communication variable may include at least one of a packet type, a packet length, a transmission section (or transmission period) (e.g., $T_{eSCO}$) of voice data, a retransmission section (e.g., $W_{eSCO}$), or information (e.g., $D_{eSCO}$) related to synchronization configurations.

According to various embodiments, the external electronic device (e.g., the processor 120 or the wireless communication circuit 192) may determine whether voice data is received from the electronic device 200, in operation 1605. According to an embodiment, when receiving voice data, the external electronic device may identify the voice data received from the electronic device 200 that negotiates communication variables, based on a channel access code (CAC) and/or a logical transport address (LT address) included in an access code area of the voice data. For example, the external electronic device may identify the voice data received from the electronic device 200, based on the CAC included in the received voice data. For another example, the external electronic device may determine whether the data received from the electronic device 200 is voice data related to a voice call, based on the LT address included in the received data. As an example, the CAC may be generated based on a low address part (LAP) of the electronic device 200 having control authority for wireless communication, for the purpose of communication between two electronic devices in a state in which the communication connection between the electronic device 200 and the external electronic device is completed. As an example, the LT address may be a variable for distinguishing a data link (e.g., asynchronous connection-oriented (ACL)) and a voice communication link (e.g., extended synchronous connection-oriented (eSCO)), and may be allocated by the electronic device 200 having the control authority of the communication link with the external electronic device.

According to various embodiments, when voice data is not received from the electronic device 200 (e.g., 'No' in operation 1605), the external electronic device (e.g., the processor 120 or the wireless communication circuit 192) may end an embodiment for transmitting and/or receiving the voice data with the electronic device 200.

According to various embodiments, when the external electronic device (e.g., the processor 120 or the wireless communication circuit 192) receives voice data from the electronic device 200 (e.g., 'Yes' in operation 1605), in operation 1607, the external electronic device (e.g., the processor 120 or the wireless communication circuit 192) may identify a packet type of the voice data. According to an embodiment, when the external electronic device identifies the voice data received from the electronic device 200, based on the CAC included in an access code area of the voice data, the external electronic device may identify a packet type included in a header of the voice data. For example, the packet type included in the header may indicate the packet type of the voice data received from the electronic device 200.

According to various embodiments, in operation 1609, the external electronic device (e.g., the processor 120 or the wireless communication circuit 192) may decode the voice data received from the electronic device, based on the packet type of the voice data. According to an embodiment, the external electronic device may transmit information related to reception of the first voice data received from the electronic device 200, to the electronic device 200. For example, when an error is detected in the first voice data, based on decoding of the first voice data received from the electronic device 200, the external electronic device may transmit reception failure information (NACK) related to the first voice data to the electronic device. For another example, when an error is not detected in the first voice data received from the electronic device 200, the external electronic device may transmit reception success information (ACK) related to the first voice data to the electronic device. According to an embodiment, the external electronic device may transmit information (e.g., NACK or ACK) related to reception of the first voice data, together with second voice data corresponding to voice information collected by the external electronic device to the electronic device.

Figure 17:
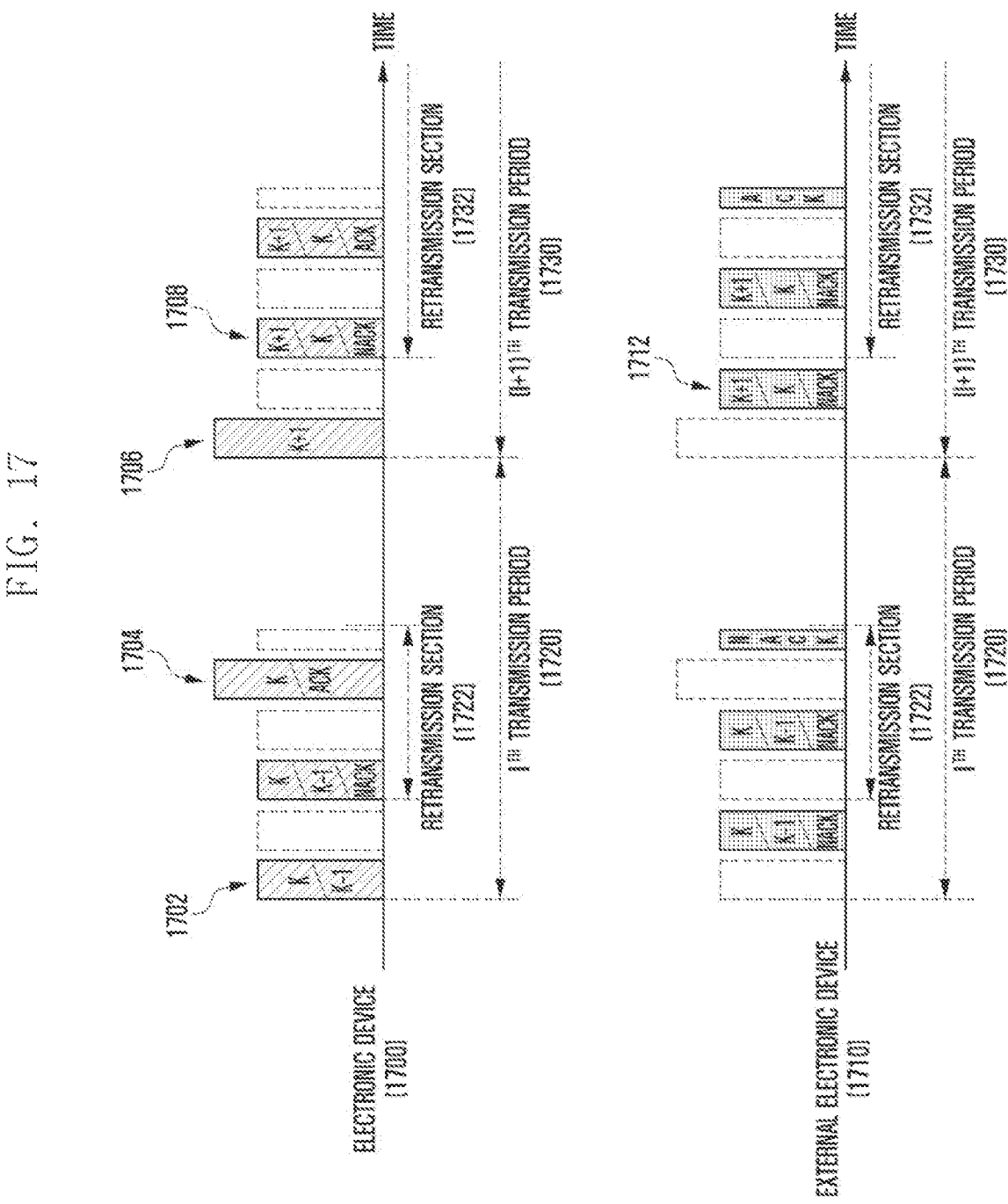
FIG. 17 illustrates a configuration for transmitting and/or receiving voice data between an electronic device and an external electronic device according to various embodiments of the disclosure.

According to various embodiments, when the external electronic device successfully receives voice data based on a packet type not negotiated with the electronic device 200, as shown in FIG. 17, the external electronic device may transmit reception failure information to the electronic device 200 for reception of additional voice data.

FIG. 17 illustrates a configuration for transmitting and/or receiving voice data between an electronic device and an external electronic device according to various embodiments of the disclosure.

According to various embodiments, the electronic device 1700 may transmit first voice data 1702 of a first packet type (e.g., 2-EV3) negotiated with the external electronic device 1710 to the external electronic device 1710 in an $i^{th}$ transmission period 1720. For example, the first voice data 1702 may include a $k^{th}$ packet and a $(k-1)^{th}$ packet, based on the first packet type (e.g., 2-EV3).

According to various embodiments, the electronic device 1700 may retransmit second voice data 1704 to the external electronic device 1710 in a retransmission section 1722, based on reception failure information corresponding to the first voice data 1702. For example, the electronic device 1700 may retransmit second voice data 1704 of a second packet type (e.g., EV3) different from the first packet type to the external electronic device 1710, based on status information of wireless communication with the external electronic device 1710. For example, the second voice data 1704 may include a $k^{th}$ packet, based on the second packet type (e.g., EV3). For example, when the electronic device 1700 does not receive reception success information for the second voice data 1704 during the retransmission section 1722, the electronic device 1700 may determine that transmission of the $k^{th}$ packet included in the second voice data 1704 has failed.

According to an embodiment, when an $(i+1)^{th}$ transmission period 1730 arrives, the electronic device 1700 may transmit third voice data 1706 to the external electronic device 1710. For example, the electronic device 1700 may transmit the third voice data 1706 of the second packet type (e.g., EV3) to the external electronic device 1710, based on the status information of wireless communication with the external electronic device 1710. For example, the third voice data 1706 may include a $(k+1)^{th}$ packet, based on the second packet type (e.g., EV3).

According to an embodiment, when an error is not detected in the third voice data 1706, the external electronic device 1710 may determine that reception of the $(k+1)^{th}$ packet included in the third voice data 1706 has succeeded. When the external electronic device 1710 succeeds in receiving the $(k+1)^{th}$ packet but fails to receive the $k^{th}$ packet in the $i^{th}$ transmission period 1720, the external electronic device 1710 may transmit reception failure information (NACK) to the electronic device 1700 in order to relatively increase the probability of receiving the $k^{th}$ packet.

According to an embodiment, the electronic device 1700 may retransmit fourth voice data 1708 to the external electronic device 1710 in the retransmission section 1722, based on reception failure information corresponding to the third voice data 1706. For example, the electronic device 1700 may retransmit the fourth voice data 1708 of the first packet type (e.g., 2-EV3) to the external electronic device 1710, based on the status information of wireless communication with the external electronic device 1710. For example, the fourth voice data 1708 may include a $k^{th}$ packet and a $(K+1)^{th}$ packet, based on the first packet type (e.g., 2-EV3).

The embodiments of the disclosure disclosed in the present specification and drawings are only presented as specific examples to easily explain the technical content according to the embodiments of the present disclosure and help understanding of the embodiments of the disclosure, but not intended to limit the scope of the embodiments of the disclosure. Therefore, the scope of various embodiments of the disclosure should be construed as including all changes or modified forms derived based on the technical spirit of various embodiments of the disclosure in addition to the embodiments disclosed herein are included in the scope of various embodiments of the disclosure.

What is claimed is:

1. An electronic device comprising:
a communication circuit;
memory storing at least one instruction; and
at least one processor operatively coupled to the communication circuit,
wherein the at least one instruction, when executed by the at least one processor individually or collectively, causes the electronic device to:
establish communication with an external electronic device through the communication circuit;
configure a first type of packet for transmission or reception of voice data through negotiation with the external electronic device;
transmit first voice data to the external electronic device based on the first type of packet;
receive, from the external electronic device, second voice data of the first type of packet and reception failure information corresponding to the first voice data;
based on the receiving the reception failure information corresponding to the first voice data from the external electronic device, transmit third voice data corresponding to the first voice data to the external electronic device based on a second type of packet having a higher transmit power than the first type of packet;

decode the second voice data; and transmit information corresponding to reception of the second voice data to the external electronic device.

2. The electronic device of claim 1, wherein the at least one instruction, when executed by the at least one processor individually or collectively, further causes the electronic device to, based on receiving reception failure information corresponding to the third voice data from the external electronic device, transmit fourth voice data corresponding to the third voice data to the external electronic device based on the first type of packet.

3. The electronic device of claim 1, wherein the at least one instruction, when executed by the at least one processor individually or collectively, further causes the electronic device to, based on receiving reception failure information corresponding to the third voice data from the external electronic device, transmit fifth voice data corresponding to the third voice data to the external electronic device based on the second type of packet.

4. The electronic device of claim 1, wherein the first type of packet further comprises information related to at least one of a first modulation method or a first packet length, configured through negotiation with the external electronic device, for transmission of voice data, and wherein the second type of packet further comprises information related to at least one of a second modulation method that is different from the first modulation method or a second packet length that is different from the first packet length.

5. The electronic device of claim 4, wherein the first type of packet further comprises one of high-quality voice (HV)1, HV2, HV3, data-voice (DV), enhanced voice packet (EV)3, 2-EV3, 3-EV3, EV4, EV5, 2-EV5, and 3-EV5, and wherein the second type of packet is different from the first type of packet and further comprises one of high-quality voice (HV)1, HV2, HV3, data-voice (DV), enhanced voice packet (EV)3, 2-EV3, 3-EV3, EV4, EV5, 2-EV5, and 3-EV5.

6. The electronic device of claim 1, wherein the at least one instruction, when executed by the at least one processor individually or collectively, further causes the electronic device to transmit, to the external electronic device, information corresponding to reception of the second voice data together with the third voice data based on the second type of packet.

7. The electronic device of claim 6, wherein the at least one instruction, when executed by the at least one processor individually or collectively, further causes the electronic device to, based on the reception failure information corresponding to the second voice data being transmitted to the external electronic device, receive sixth voice data corresponding to the second voice data of the second type of packet from the external electronic device.

8. The electronic device of claim 1, wherein the first voice data and the third voice data comprise the same voice information.

9. The electronic device of claim 1, wherein the first voice data and the third voice data comprise different voice information.

10. An operation method of an electronic device, the operation method comprising:

establishing communication with an external electronic device;

configuring a first type of packet for transmission or reception of voice data through negotiation with the external electronic device;

transmitting first voice data to the external electronic device based on the first type of packet;

receiving, from the external electronic device, second voice data of the first type of packet and reception failure information corresponding to the first voice data;

based on the receiving the reception failure information corresponding to the first voice data from the external electronic device, transmitting third voice data corresponding to the first voice data to the external electronic device based on a second type of packet having a higher transmit power than the first type of packet;

decoding the second voice data; and transmitting information corresponding to reception of the second voice data to the external electronic device.

11. The operation method of claim 10, further comprising, based on receiving reception failure information corresponding to the third voice data from the external electronic device, transmitting fourth voice data corresponding to the third voice data to the external electronic device based on the first type of packet.

12. The operation method of claim 10, further comprising, based on receiving reception failure information corresponding to the third voice data from the external electronic device, transmitting fifth voice data corresponding to the third voice data to the external electronic device based on the second type of packet.

13. The operation method of claim 10, wherein the transmitting information related to the reception of the second voice data to the external electronic device comprises transmitting, to the external electronic device, the information corresponding to reception of the second voice data together with the third voice data, based on the second type of packet.

14. The operation method of claim 13, further comprising, based on reception failure information corresponding to the second voice data being transmitted to the external electronic device, receiving sixth voice data corresponding to the second voice data of the second type of packet from the external electronic device.

15. The operation method of claim 10, wherein the first voice data and the third voice data comprise the same voice information.

16. The operation method of claim 10, wherein the first voice data and the third voice data comprise different voice information.

17. An electronic device comprising:

a communication circuit;

memory storing at least one instruction; and at least one processor operatively coupled to the communication circuit, wherein the at least one instruction, when executed by the at least one processor individually or collectively, causes the electronic device to:

establish communication with an external electronic device through the communication circuit;

configure a first type of packet for transmission or reception of voice data through negotiation with the external electronic device;

transmit first voice data to the external electronic device based on the first type of packet;

based on receiving reception failure information corresponding to the first voice data from the external electronic device or not receiving reception information corresponding to the first voice data from the external electronic device, transmit second voice data to the external electronic device based on a second type of packet different from the first type of packet; and based on receiving reception failure information corresponding to the second voice data from the external electronic device, transmit third voice data to the external electronic device based on the first type of packet.

\* \* \* \* \*